United States Patent
Cao et al.

(10) Patent No.: US 11,843,177 B2
(45) Date of Patent: Dec. 12, 2023

(54) ANTENNA APPARATUS AND RELATED DEVICE

(71) Applicant: Huawei Technologies Co., Ltd., Shenzhen (CN)

(72) Inventors: Yi Cao, Shenzhen (CN); Mu Zhou, Shanghai (CN); Cong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 744 days.

(21) Appl. No.: 17/004,604

(22) Filed: Aug. 27, 2020

(65) Prior Publication Data
US 2020/0395683 A1    Dec. 17, 2020

Related U.S. Application Data

(63) Continuation of application No. PCT/CN2019/076368, filed on Feb. 27, 2019.

(30) Foreign Application Priority Data

Feb. 28, 2018   (CN) .......................... 201810173070.5

(51) Int. Cl.
*H04B 7/06*      (2006.01)
*H01Q 21/08*     (2006.01)
*H04B 7/08*      (2006.01)

(52) U.S. Cl.
CPC ........... *H01Q 21/08* (2013.01); *H04B 7/0695* (2013.01); *H04B 7/088* (2013.01)

(58) Field of Classification Search
CPC .............. H04B 7/0695; H04B 7/06952; H04B 7/0874; H04B 7/088; H04B 7/0891;
(Continued)

(56) References Cited

U.S. PATENT DOCUMENTS 4,611,208 A    9/1986   Kane et al.
6,195,037 B1   2/2001   Gross et al.
(Continued)

FOREIGN PATENT DOCUMENTS

CN    1283316 A    2/2001
CN    1363152 A    8/2002
(Continued)

OTHER PUBLICATIONS

Changqing, Z., "Research on beamforming and miniaturization of area array and vol. array," China Mobile Hunan Co., Ltd. Yueyang Branch, Mobile Communication, 2020, With an English Abstract, 9 pages.

(Continued)

*Primary Examiner* — Quochien B Vuong
(74) *Attorney, Agent, or Firm* — Conley Rose, P.C.

(57) ABSTRACT

An antenna apparatus, which includes an antenna array and a processor, where the processor is configured to determine a first antenna subarray from N rows and M columns of radiating elements of the antenna array, where the first antenna subarray includes X1 rows and Y1 columns of radiating elements, and X1 is greater than Y1, control a phase shift increment change of the first antenna subarray to generate a plurality of first beams, determine a first aligned beam from the first beams based on a first feedback from a receive end, determine a second antenna subarray, where the second antenna subarray includes X2 rows and Y2 columns of radiating elements, and Y2 is greater than X2, and determine a second aligned beam from the second beams based on a second feedback from the receive end.

20 Claims, 17 Drawing Sheets

(58) Field of Classification Search
CPC .... H04B 7/0894; H01Q 3/2605; H01Q 21/06;
H01Q 21/061; H01Q 21/08; H01Q 21/24;
H01Q 25/00; H01Q 25/002
See application file for complete search history.

(56) References Cited

U.S. PATENT DOCUMENTS

| | | | | |
|---|---|---|---|---|
| 6,661,375 | B2* | 12/2003 | Rickett | H01Q 21/061 |
| | | | | 342/383 |
| 10,756,443 | B1* | 8/2020 | Struhsaker | H01Q 25/002 |
| 11,239,890 | B2* | 2/2022 | Kim | H04B 7/0456 |
| 11,469,525 | B2* | 10/2022 | Zhang | H04B 7/10 |
| 2014/0210666 | A1 | 7/2014 | Maltsev et al. | |
| 2015/0325912 | A1 | 11/2015 | Liu | |
| 2017/0134083 | A1 | 5/2017 | Kim et al. | |
| 2017/0187110 | A1 | 6/2017 | Fujio | |
| 2021/0226681 | A1* | 7/2021 | Raghavan | H04B 7/0874 |

FOREIGN PATENT DOCUMENTS

| | | |
|---|---|---|
| CN | 101467303 A | 6/2009 |
| CN | 103052086 A | 4/2013 |
| CN | 103812547 A | 5/2014 |
| CN | 106559114 A | 4/2017 |
| CN | 109121208 A | 1/2019 |
| CN | 106716720 B | 2/2020 |
| EP | 2260539 B1 | 5/2018 |
| EP | 3780280 A1 | 2/2021 |
| JP | 2017118335 A | 6/2017 |
| WO | 2011101225 A1 | 8/2011 |
| WO | 2019149137 A1 | 8/2019 |

OTHER PUBLICATIONS

Xiao, Z., et al., "Hierarchical Codebook Design for Beamforming Training in Millimeter-Wave Communication," IEEE Transactions on Wireless Communications, vol. 15, No. 5, Jan. 18, 2016, 9 pages.

* cited by examiner

ANTENNA APPARATUS AND RELATED DEVICE

CROSS-REFERENCE TO RELATED APPLICATIONS

This application is a continuation of International Patent Application No. PCT/CN2019/076368 filed on Feb. 27, 2019, which claims priority to Chinese Patent Application No. 201810173070.5 filed on Feb. 28, 2018. The disclosures of the aforementioned applications are hereby incorporated by reference in their entireties.

TECHNICAL FIELD

The present application relates to the field of communications technologies, and in particular, to an antenna apparatus and a related device.

BACKGROUND

A large antenna array can overcome path loss of multipath transmission due to a high frequency and a high gain and meets requirements for scenarios such as backhaul and mobility in $5^{th}$ generation (5G) communications. A larger quantity of array elements in a large array indicates a smaller beam width, more challenging beam alignment within a specified sweeping range, and a longer time for beam sweeping and beam alignment.

During array beam alignment, a single beam has small coverage, and a beam sweeping manner is required for frequent switching between beams. For a long-distance point-to-point (PTP) communication, beam alignment between a transmit antenna and a receive antenna requires completion of a sector sweep (sector-level sweep (SLS)) process, and beam sweeping needs to be performed once on each of a receive end and a transmit end. A transmit-end antenna array sequentially sends data including a sector number (sector identifier (SID)), and a receive end receives a signal through a quasi-omnidirectional antenna, determines information about a best sector number based on quality of the received signal, and feeds back the information about the best sector number to a transmit end. Similarly, a receive antenna sequentially sends data including a SID, and a transmit antenna receives a signal through a quasi-omnidirectional antenna, and feeds back information about a best sector number to the receive end. The transmit antenna and the receive antenna complete beam alignment through a feedback and a notification of sector sweep. In this case, a beam sweeping time is directly proportional to a quantity of beams. Assuming that a transmit array has X to-be-swept beams in total, a receive array has Y to-be-swept beams, and a time for each beam sweeping is T, a time for full-range sweeping is X×Y×T.

In the foregoing beam alignment manner, for long-distance PTP communication, a long time is required to perform beam sweeping. Consequently, efficiency of beam alignment through sweeping is greatly reduced, and a requirement for an access scenario such as future 5G high-frequency high-speed mobility cannot be met.

SUMMARY

Embodiments of the present application provide an antenna apparatus and a related device, to improve beam alignment efficiency.

According to a first aspect, an embodiment of the present application provides an antenna apparatus. The antenna apparatus may include an antenna array and a control unit, where the antenna array includes at least N rows and M columns of radiating elements, and the control unit is configured to determine a first antenna subarray from the N rows and M columns of radiating elements, where the first antenna subarray includes X1 rows and Y1 columns of radiating elements, $1 \leq X1 \leq N$, $1 \leq Y1 \leq M$, and $X1 > Y1$, control a phase shift increment change of the first antenna subarray to generate a plurality of first beams, where different phase shift increments correspond to different first beams, and determine a first aligned beam from the plurality of first beams based on a feedback from a receive end.

In this embodiment of the present application, based on a hardware structure of the antenna array in the other approaches, the control unit in the antenna apparatus controls the phase shift increment change of the first antenna subarray in the antenna array, to generate the plurality of first beams. The first antenna subarray includes the X1 rows and Y1 columns of radiating elements, where X1 is greater than Y1. This indicates that a quantity of radiating elements of the antenna subarray in a column direction is greater than a quantity of radiating elements in a row direction. A smaller quantity of radiating elements indicates a wider beam, and a larger quantity of radiating elements indicates a narrower beam. A beam width of the first beam generated by the first antenna subarray in the row direction is greater than a beam width in the column direction. Therefore, the finally determined first aligned beam is also within a direction range that is relatively wide in the row direction and relatively narrow in the column direction. In conclusion, in this embodiment of the present application, the first antenna subarray is controlled to form a beam that is relatively wide in the row direction and relatively narrow in the column direction. Therefore, a quantity of sweeping times in a wide beam direction (that is, the row direction) can be greatly reduced, and a direction range of an aligned beam in a narrow beam direction (that is, the column direction) can be effectively narrowed.

In a possible implementation, the control unit is further configured to determine a second antenna subarray from the N rows and M columns of radiating elements, where the second antenna subarray includes X2 rows and Y2 columns of radiating elements, $1 \leq X2 \leq N$, $1 \leq Y2 \leq M$, and $Y2 > X2$, control a phase shift increment change of the second antenna subarray to generate a plurality of second beams, where different phase shift increments correspond to different second beams, and determine a second aligned beam from the plurality of second beams based on a feedback from the receive end.

In this embodiment of the present application, based on the first aspect, the beam that is relatively wide in the row direction and relatively narrow in the column direction is generated using a feature that a quantity of radiating elements in the column direction in the first antenna subarray is greater than a quantity of radiating elements in the row direction. Because the beam width in the row direction can directly cover a sweeping range in the row direction, a quantity of sweeping times in the row direction is greatly reduced. Further, a beam that is relatively wide in the column direction and relatively narrow in the row direction is generated using a feature that a quantity of radiating elements in the row direction in the second antenna subarray is greater than a quantity of radiating elements in the column direction. Because the beam width in the column direction covers an original sweeping range in the column direction, a quantity of sweeping times in the column direction is greatly reduced. In conclusion, in this embodiment of the present application, beam sweeping is respectively performed in a vertical direction and a horizontal direction using the first beam (which is wide in the row direction and narrow in the column direction) and the second beam (which is wide in the column direction and narrow in the row direction), to obtain the first aligned beam and the second aligned beam, and a beam direction range that is relatively narrow in both the row direction and the column direction may be finally determined based on a direction range in which the first aligned beam intersects with the second aligned beam. In this way, an alignment direction area with a relatively precise range can be determined through a relatively small quantity of beam sweeping times, thereby improving beam alignment efficiency.

In a possible implementation, the control unit may first determine the second antenna subarray to determine the second aligned beam, and then determine the first antenna subarray to determine the first aligned beam. That is, in this embodiment of the present application, sweeping in a vertical direction (the column direction) may be first performed, and then sweeping in a horizontal direction (the row direction) is performed. Alternatively, sweeping in a horizontal direction may be first performed, and then sweeping in a vertical direction is performed. This is not limited in this application, and positions of N rows of radiating elements are perpendicular to positions of M columns of radiating elements in this application.

In a possible implementation, the control unit is further configured to perform Hanning window weighting processing on amplitudes controlled by power amplifiers in each column of radiating elements in the first antenna subarray. In this embodiment of the present application, in a vertical coarse sweeping process, Hanning window processing is performed on radiating elements in the first antenna subarray in the column direction, to increase a width of the first beam in the column direction, thereby reducing a quantity of times of sweeping the first beam in the column direction, and reducing a sweeping time.

In a possible implementation, the control unit is further configured to perform Hanning window weighting processing on amplitudes controlled by power amplifiers in each row of radiating elements in the second antenna subarray. In this embodiment of the present application, in a horizontal coarse sweeping process, Hanning window processing is performed on radiating elements in the first antenna subarray in the row direction, to increase a width of the second beam in the row direction, thereby reducing a quantity of times of sweeping the second beam in the row direction, and reducing a sweeping time.

In a possible implementation, the control unit is further configured to determine a third antenna subarray from the N rows and M columns of radiating elements, where the third antenna subarray includes X3 rows and Y3 columns of radiating elements, $X1 \leq X3 \leq N$, and $Y2 \leq Y3 \leq M$, control the third antenna subarray to generate, based on different phase shift increments, a plurality of third beams with different directions, where centers of circles of projections of the plurality of third beams on the first plane are within an alignment area, and the alignment area is an area in which a projection of the first aligned beam on the first plane intersects a projection of the second aligned beam on the first plane, and determine a third aligned beam from the plurality of third beams based on a feedback from the receive end. In this embodiment of the present application, based on a direction range of the aligned beam determined through beam sweeping in the vertical direction and the horizontal direction, a direction of the aligned beam is further determined in the direction range in a fine sweeping manner, to perform more precise beam alignment.

According to a second aspect, an embodiment of the present application provides an antenna apparatus. The antenna apparatus may include a processor and a memory, where the memory is configured to store antenna control code, and the processor is configured to invoke the antenna control code to perform operations performed by the control unit in the antenna apparatus according to the first aspect or any aspect of the first aspect.

According to a third aspect, an embodiment of the present application provides an antenna apparatus. The antenna apparatus may include a first determining unit configured to determine a first antenna subarray from the N rows and M columns of radiating elements, where the first antenna subarray includes X1 rows and Y1 columns of radiating elements, $1 \leq X1 \leq N$, $1 \leq Y1 \leq M$, and $X1 > Y1$, a first sweeping unit configured to control a phase shift increment change of the first antenna subarray to generate a plurality of first beams, where different phase shift increments correspond to different first beams, and a first alignment unit configured to determine a first aligned beam from the plurality of first beams based on a feedback from a receive end.

In a possible implementation, the antenna apparatus further includes a second determining unit configured to determine a second antenna subarray from the N rows and M columns of radiating elements, where the second antenna subarray includes X2 rows and Y2 columns of radiating elements, $1 \leq X2 \leq N$, $1 \leq Y2 \leq M$, and $Y2 > X2$, a second sweeping unit configured to control a phase shift increment change of the second antenna subarray to generate a plurality of second beams, where different phase shift increments correspond to different second beams, and a second alignment unit configured to determine a second aligned beam from the plurality of second beams based on a feedback from the receive end.

In a possible implementation, the antenna apparatus further includes a third determining unit configured to determine a third antenna subarray from the N rows and M columns of radiating elements, where the third antenna subarray includes X3 rows and Y3 columns of radiating elements, $X1 \leq X3 \leq N$, and $Y2 \leq Y3 \leq M$, a third sweeping unit configured to control the third antenna subarray to generate, based on different phase shift increments, a plurality of third beams with different directions, where centers of circles of projections of the plurality of third beams on the first plane are within an alignment area, and the alignment area is an area in which a projection of the first aligned beam on the first plane intersects a projection of the second aligned beam on the first plane, and a third alignment unit configured to determine a third aligned beam from the plurality of third beams based on a feedback from the receive end.

In a possible implementation, the antenna apparatus further includes a first weighting unit configured to perform Hanning window weighting processing on amplitudes controlled by power amplifiers in each column of radiating elements in the first antenna subarray. In this embodiment of the present application, in a vertical coarse sweeping process, Hanning window processing is performed on radiating elements in the first antenna subarray in a column direction, to increase a width of the first beam in the column direction, thereby reducing a quantity of times of sweeping the first beam in the column direction, and reducing a sweeping time.

In a possible implementation, the antenna apparatus further includes a second weighting unit configured to perform Hanning window weighting processing on amplitudes controlled by power amplifiers in each row of radiating elements in the second antenna subarray. In this embodiment of the present application, in a horizontal coarse sweeping process, Hanning window processing is performed on radiating elements in the first antenna subarray in a row direction, to increase a width of the second beam in the row direction, thereby reducing a quantity of times of sweeping the second beam in the row direction, and reducing a sweeping time.

With reference to any implementation of the first aspect, the second aspect, or the third aspect, in a possible implementation, when Y1 is greater than or equal to 2, a column spacing between any two adjacent columns of radiating elements in Y1 columns of radiating elements is d1, and $\lambda/4 \leq d1 \leq \lambda$, where $\lambda$ represents wavelength. In this embodiment of the present application, in the first antenna subarray, a range of a spacing between columns of radiating elements is set to a range smaller than $\lambda/4 \leq d1 \leq \lambda$, to prevent the first beam from forming a grating lobe in the row direction, and ensure a better waveform and better beam quality of the first beam.

With reference to any implementation of the first aspect, the second aspect, or the third aspect, in a possible implementation, each of the Y1 columns of radiating elements includes at least two first radiating elements, a row spacing between any two adjacent rows of first radiating elements in the at least two first radiating elements is d2, and $\lambda/4 \leq d2 \leq \lambda$. In this embodiment of the present application, in the first antenna subarray, a range of a row spacing between adjacent radiating elements in any column of radiating elements is set to a range smaller than $\lambda/4 \leq d2 \leq \lambda$, to prevent the first beam from forming a grating lobe in the column direction, and ensure a better waveform and better beam quality of the first beam.

With reference to any implementation of the first aspect, the second aspect, or the third aspect, in a possible implementation, a line formed by connecting center points of projections of the plurality of first beams on the first plane is in a first direction, and the first direction is parallel to a column direction of the X1 rows and Y1 columns of radiating elements. In this embodiment of the present application, because the first beam is a beam that is relatively wide in the row direction and relatively narrow in the column direction, a projection of the first beam on the first plane is similar to an ellipse, and the elliptical projection may cover, in the row direction, a plurality of projection circles of beams to be swept point by point in the other approaches. Therefore, when the line formed by connecting the center points of the projections of the plurality of first beams on the first plane is parallel to the column direction, that is, the first direction, narrow beams to be swept point by point in the other approaches may be covered by a minimum quantity of first beams within an area range. In this way, the first aligned beam can be obtained through a minimum quantity of sweeping times.

With reference to any implementation of the first aspect, the second aspect, or the third aspect, in a possible implementation, a line formed by connecting center points of projections of the plurality of second beams on the first plane is in a second direction, and the second direction is parallel to a row direction of the X2 rows and Y2 columns of radiating elements. In this embodiment of the present application, because the second beam is a beam that is relatively wide in the column direction and relatively narrow in the row direction, a projection of the second beam on the first plane is similar to an ellipse, and the elliptical projection may cover, in the column direction, a plurality of projection circles of beams to be swept point by point in the other approaches. Therefore, when the line formed by connecting the center points of the projections of the plurality of second beams on the first plane is parallel to the row direction, that is, the second direction, narrow beams to be swept point by point in the other approaches may be covered by a minimum quantity of second beams within an area range. In this way, the second aligned beam can be obtained through a minimum quantity of sweeping times.

With reference to any implementation of the first aspect, the second aspect, or the third aspect, in a possible implementation, the third antenna subarray includes the N rows and M columns of radiating elements. In this embodiment of the present application, a narrow beam may be formed by controlling a phase shift increment change of the N rows and M columns of radiating elements included in the antenna array, and more precise fine sweeping is performed within an alignment range determined through coarse sweeping.

With reference to any implementation of the first aspect, the second aspect, or the third aspect, in a possible implementation, a beam width of the first beam in the first direction is K, sweeping steps of the plurality of first beams are K/2, and the first direction is parallel to the column direction of the X1 rows and Y1 columns of radiating elements. In this embodiment of the present application, in the vertical sweeping direction, the sweeping step is set to half of the width of the first beam in the first direction, to improve sweeping precision in the vertical direction and avoid missing sweeping an aligned beam.

With reference to any implementation of the first aspect, the second aspect, or the third aspect, in a possible implementation, a beam width of the second beam in the second direction is K, sweeping steps of the plurality of second beams are K/2, and the second direction is parallel to the row direction of the X2 rows and Y2 columns of radiating elements. In this embodiment of the present application, in the horizontal sweeping direction, the sweeping step is set to half of the width of the second beam in the second direction, to improve sweeping precision in the horizontal direction and avoid missing sweeping an aligned beam.

With reference to any implementation of the first aspect, the second aspect, or the third aspect, in a possible implementation, the beam width of the first beam in the first direction is K, and/or the beam width of the second beam in the second direction is K, and a beam width of the third beam in the first direction or the second direction is L, the sweeping steps of the plurality of first beams are L/2, and L<K. In this embodiment of the present application, in a fine sweeping process, a width of a to-be-finely-swept beam is set to be less than the width of the first beam or the second beam. In this way, a finer beam may be used to perform more precise sweeping after coarse sweeping. In addition, because the sweeping step is set to half of the width of the to-be-finely-swept beam, sweeping precision of fine sweeping can be improved, and finally, an aligned beam with higher precision is determined.

With reference to any implementation of the first aspect, the second aspect, or the third aspect, in a possible implementation, when X2 is greater than or equal to 2, a row spacing between any two adjacent rows of radiating elements in X2 rows of radiating elements is d3, and $\lambda/4 \leq d3 \leq \lambda$. In this embodiment of the present application, in the second antenna subarray, a range of a spacing between columns of radiating elements is set to a range smaller than $\lambda/4 \leq d3 \leq \lambda$, to prevent the second beam from forming a grating lobe in the row direction, and ensure a better waveform and better beam quality of the second beam.

With reference to any implementation of the first aspect, the second aspect, or the third aspect, in a possible implementation, each of the Y2 rows of radiating elements includes at least two second radiating elements, a column spacing between any two adjacent columns of second radiating elements in the at least two second radiating elements is d4, and $\lambda/4 \leq d4 \leq \lambda$. In this embodiment of the present application, in the second antenna subarray, a range of a row spacing between adjacent radiating elements in any column of radiating elements is set to a range smaller than $\lambda/4 \leq d4 \leq \lambda$, to prevent the second beam from forming a grating lobe in the column direction, and ensure a better waveform and better beam quality of the first beam.

With reference to any implementation of the first aspect, the second aspect, or the third aspect, in a possible implementation, any two radiating elements in a same row in the first antenna subarray have an equal phase, and any two rows of adjacent radiating elements in the first antenna subarray have an equal phase difference at a same moment. In this embodiment of the present application, a phase of each radiating element in the first antenna array and a phase difference between radiating elements are set using a phase shift increment in a phased antenna array, to generate a plurality of first beams with different directions.

With reference to any implementation of the first aspect, the second aspect, or the third aspect, in a possible implementation, any two radiating elements in a same column in the second antenna subarray have an equal phase, and any two columns of adjacent radiating elements in the second antenna subarray have an equal phase difference at a same moment. In this embodiment of the present application, a phase of each radiating element in the second antenna array and a phase difference between radiating elements are set using a phase shift increment in a phased antenna array, to generate a plurality of second beams with different directions.

According to a fourth aspect, an embodiment of the present application provides an antenna array, where the antenna array includes a processor, and the processor is configured to support the antenna array in performing a corresponding function of the control unit in the antenna apparatus provided in the first aspect. The antenna array may further include a memory. The memory is configured to be coupled to the processor, and the memory stores a program instruction and data that are necessary for the antenna array. The antenna array may further include a communications interface, used for communication between the antenna array and another device or a communications network.

According to a fifth aspect, an embodiment of the present application provides a network device, where the network device includes a processor, and the processor is configured to support the network device in implementing a function of the antenna apparatus provided in the first aspect. The network device may further include a memory. The memory is configured to be coupled to the processor, and the memory stores a program instruction and data that are necessary for the network device. The network device may further include a communications interface, used for communication between the network device and another device or a communications network. Optionally, the network device is a base transceiver station (BTS) in a time division synchronous code-division multiple access (CDMA) (TD-SCDMA) system, an evolved NodeB (eNB) in a Long-Term Evolution (LTE) system, or a base station in a 5G system or in a New Radio (NR) system. Alternatively, the base station may be an access point (AP), a transmission node (Trans transmission reception point (TRP), a central unit (CU), or another network entity, and may include some or all of functions of the foregoing network entity.

According to a sixth aspect, an embodiment of the present application provides a terminal device, where the terminal device includes a processor, and the processor is configured to support the terminal device in implementing a function of the antenna apparatus provided in the first aspect. The terminal device may further include a memory. The memory is configured to be coupled to the processor, and the memory stores a program instruction and data that are necessary for the terminal device. The terminal device may further include a communications interface, used for communication between the terminal device and another device or a communications network. Optionally, the terminal device is user equipment, a mobile device, a mobile station, a mobile unit, a machine-to-machine (M2M) terminal, a radio unit, a remote unit, a terminal agent, or a mobile client.

According to a seventh aspect, an embodiment of the present application provides a processing apparatus, where the processing apparatus includes a processor, and the processor is configured to support the processing apparatus in implementing a function of the antenna apparatus provided in the first aspect.

According to an eighth aspect, an embodiment of the present application provides a computer storage medium configured to store a computer software instruction used by the processor in the antenna apparatus provided in the second aspect. The computer software instruction includes a program designed for executing the foregoing aspects.

According to a ninth aspect, an embodiment of the present application provides a computer program, where the computer program includes an instruction, and when the computer program is executed by a computer, the computer is enabled to perform a procedure performed by the processor in the antenna apparatus according to the second aspect.

BRIEF DESCRIPTION OF DRAWINGS

To describe the technical solutions in some of the embodiments of the present application more clearly, the following describes the accompanying drawings for describing some of the embodiments of the present application.

DESCRIPTION OF EMBODIMENTS

Figure 1:
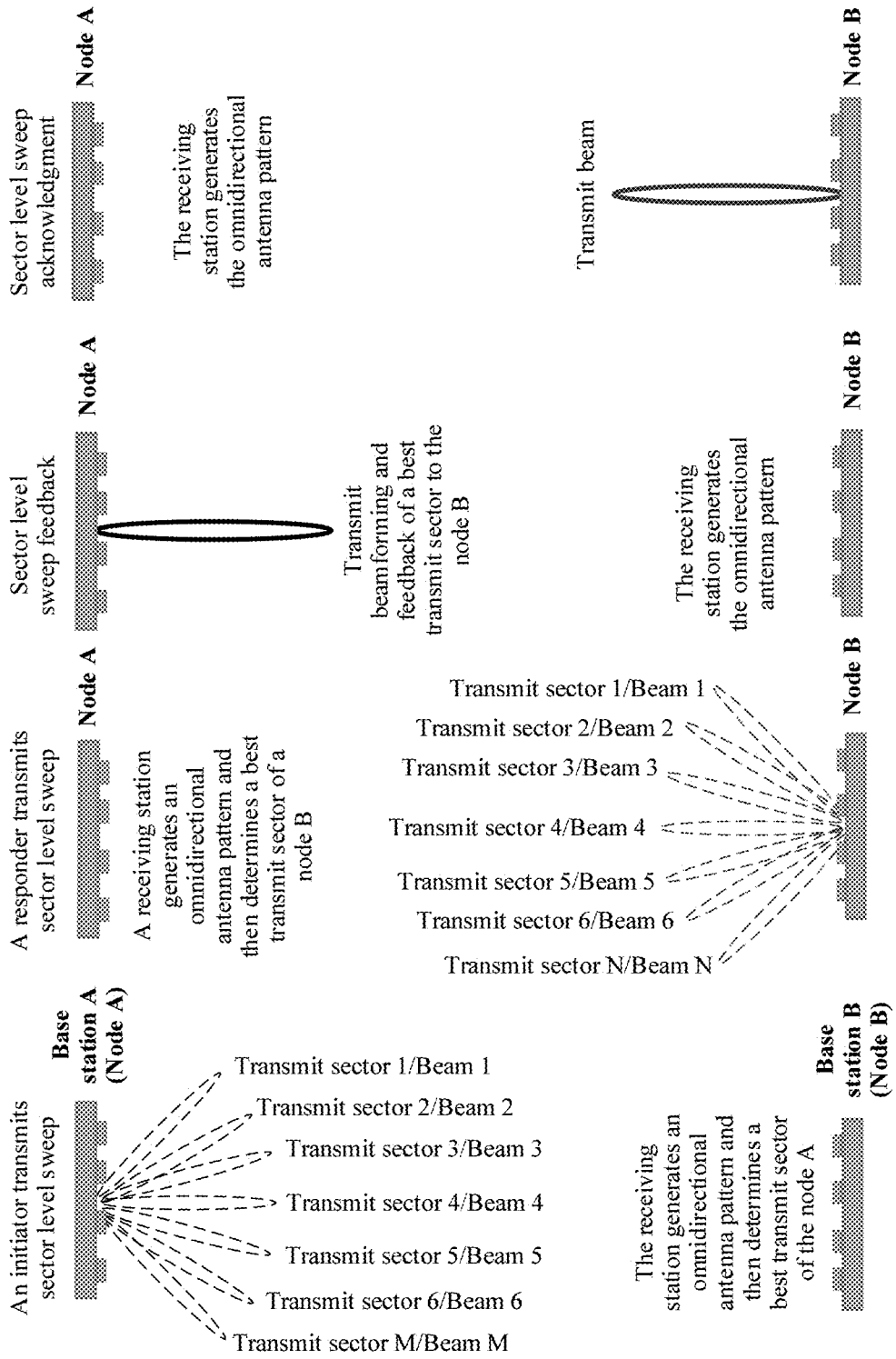
FIG. 1 is a schematic diagram of a sector beam sweeping process according to an embodiment of the present application.

The following describes the embodiments of the present application with reference to the accompanying drawings in the embodiments of the present application.

In the specification, claims, and accompanying drawings of this application, the terms "first", "second", "third", "fourth" and so on are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in this specification means that a particular characteristic, structure, or feature described with reference to the embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that the embodiments described in this specification may be combined with another embodiment.

Terms such as "component", "module", and "system" used in this specification are used to indicate computer-related entities, hardware, firmware, combinations of hardware and software, software, or software being executed. For example, a component may be, but is not limited to, a process running on a processor, a processor, an object, an executable file, a thread of execution, a program, and/or a computer. As shown in figures, both a computing device and an application running on a computing device may be components. One or more components may reside within a process and/or a thread of execution, and the component may be located on one computer and/or distributed between two or more computers. In addition, these components may be executed from various computer readable media that store various data structures. For example, the components may communicate using a local and/or remote process and based on, for example, a signal having one or more data packets (for example, data from two components interacting with another component in a local system, a distributed system, and/or across a network such as the internet interacting with other systems using the signal).

Some terms in this application are first described, to help a person skilled in the art have a better understanding.

(1) Antenna pattern: The antenna pattern is also referred to as a radiation pattern or a far-field pattern.

The antenna pattern is a pattern in which relative field strength (a normalized modulus value) of a radiation field changes with a direction at a specific distance from an antenna, and is usually represented using two mutually vertical plane patterns in a maximum radiation direction of the antenna. The antenna pattern may be divided into a horizontal plane pattern and a vertical plane pattern.

(2) Antenna array: A single antenna has limited directivity. To be applicable to applications in various scenarios, two or more single antennas operating at a same frequency are fed and spatially arranged according to a specific requirement to constitute an antenna array, which is also referred to as an antenna array. Antenna radiating elements that constitute the antenna array are referred to as array elements. The antenna array may enhance and improve directivity of a radiation field, and enhance strength of the radiation field.

(3) Phased-array antenna (PAA): The PAA is a directional antenna array constituted by arranging radiating elements, a phase relationship between the radiating elements is controllable, and the antenna array controls a signal phase of each radiating element using a phase shifter. In this way, a direction in which signals of the entire antenna array are superimposed and strengthened in space is changed, to implement electronic sweeping for a beam. That is, the PAA is an antenna whose pattern shape is changed by controlling a feed phase of a radiating element in the array antenna. Controlling a phase may change a direction of a largest value in the antenna pattern, to perform beam sweeping. When the antenna is mechanically rotated, inertia is large and a speed is slow. The PAA overcomes this disadvantage. A beam sweeping speed is high, a feed phase is generally controlled by an electronic computer, and a phase change speed is fast (in milliseconds). That is, the direction of the largest value in the antenna pattern or another parameter rapidly changes.

(4) Equivalent isotropically radiated power (EIRP): The EIRP is also referred to as an effective isotropically radiated power, is a common concept in the field of radio communications, is a radiated power of a satellite or a ground station in a specified direction, and ideally, is equal to a transmit power of a power amplifier multiplied by a gain of an antenna. In logarithmic calculation, the EIRP may be expressed as:

$$\text{EIRP} = P_T - L_c + G_a,$$

$P_T$ represents the transmit power of the power amplifier, $L_c$ represents a loss on a feeder, $G_a$ represents the gain of the antenna, and EIRP is in a unit of decibel watt (dBW).

(5) Antenna gain: The antenna gain is a ratio between power densities of signals that are generated by an actual antenna and an ideal radiating element at a same point in space when input powers are equal. It quantitatively describes a degree to which an antenna intensively radiates an input power. Obviously, a gain is closely related to an antenna pattern. A narrower main lobe of the pattern indicates a smaller side lobe and a higher gain. The antenna gain is used to measure a capability of sending and receiving a signal by an antenna to and from a specific direction. The antenna gain is one of most important parameters to select a base station antenna. Generally, an increase in the gain mainly depends on reducing a width of a lobe for directional radiation on a vertical plane and maintaining omnidirectional radiation performance on a horizontal plane. Increasing the gain may be increasing coverage of a network in a determined direction, or increasing a gain margin in a determined range.

(6) Hanning window: The Hanning window may be considered as a special case of a raised cosine window, and the Hanning window may be considered as a sum of spectrums of three rectangular time windows or a sum of three sinc (t)-type functions. Two items in brackets are shifted to the left and right each by π/T relative to those of the first spectrum window such that side lobes offset each other, and high-frequency interference and energy leakage are eliminated. The Hanning window is applicable to a non-periodic continuous signal.

(7) Codeword: The codeword is a signal encoded using a Huffman code. One frame includes m data bits (that is, packets) and r redundancy bits (parity bits). Total length of the frame=data bits+redundancy bits. An $X^{th}$ unit that includes data bits and parity bits is usually referred to as $X^{th}$ codeword. A codeword includes several code elements, and is usually represented as several binary codes in computer communications.

(8) Grating lobe (GL): For a uniform linear array of N radiating elements, if a spacing d between elements in array exceeds one time a wavelength, a side lobe whose amplitude is equal to an amplitude of a main lobe periodically appears, and is referred to as a grating lobe. N is an integer greater than 2. A beamwidth and a gain amplitude of the grating lobe are similar to a beamwidth and a gain amplitude of the main lobe.

FIG. 1 is a schematic diagram of a sector beam sweeping process according to an embodiment of the present application. An implementation process of sector beam sweeping and alignment in a large antenna array may be as follows.

1. In the sector beam sweeping process, a transmit end Node A sequentially sends beams including sector identifiers (IDs), and an antenna of a receive end NodeB is set to an omnidirectional antenna mode. A signal-to-noise ratio (SNR), an error vector magnitude (EVM), a received signal strength indicator (RSSI), and a received channel power parameter (i.e., received channel power indicator (RCPI)) of each sector beam at the receive end are calculated, and a best beam number, for example, a sector ID 1, of best beam signal quality, sent by the transmit end is recorded.

2. The antenna of the receive end transmits beams of different sectors to the transmit end in a same manner, and a mode of an antenna of the transmit end is switched to a receive mode, and the antenna of the transmit end receives and calculates, in an omnidirectional antenna mode, a best beam number, for example, a sector ID 2, of best beam signal quality, sent by the receive end. It should be noted that when transmitting beams of different sectors to the transmit end, the receive end feeds back the best beam number sector ID 1 of the transmit end to the transmit end.

3. The transmit end sets the antenna to the best beam number Best Sector ID, that is, the sector ID 1, and sends the best beam number sector ID 2 of the receive end to the receive end. The receive-end antenna is in an omnidirectional mode (quasi-omni antenna pattern).

4. After receiving the best sector number sector ID 2 sent by the transmit end, the receive end re-sends the best sector number sector ID 1 of the transmit end to the transmit end as receipt information, to acknowledge that sector beam sweeping is completed between the transmit end and the receive end. In this case, the antenna of the transmit end is in an omnidirectional mode.

However, a larger quantity of radiating elements in the antenna array indicates a finer generated beam. Therefore, in an existing manner, because a scale of the antenna array increases, a beam is narrower, and a quantity of to-be-swept beams also sharply increases. For example, for an M×N array within specific coverage, a corresponding quantity $N_{sector}$ of beams to be swept is in direct proportion to a size M×N of the array, and a sweeping time linearly increases with the quantity of beams to be swept:

$$N_{sector} \propto F(M \times N).$$

In conclusion, storage and reading of a large quantity of beams requires more hardware, and a beam alignment time is long. Consequently, beam alignment efficiency of a large array in an existing sweeping manner is low, and a requirement for supporting a fast movement scenario and a requirement of a low latency in 5G high-frequency communication are not met. In addition, because power consumption of a front-end circuit of the antenna array is relatively large, a temperature may easily increase. After the temperature increases, performance of active components such as a power amplifier and a low-noise amplifier in the front-end circuit of the antenna array deteriorates. As a result, an antenna gain decreases, and a system link budget requirement is not met. This further results in a limited communication distance, a high bit error rate, and communication quality degradation.

Figure 2:
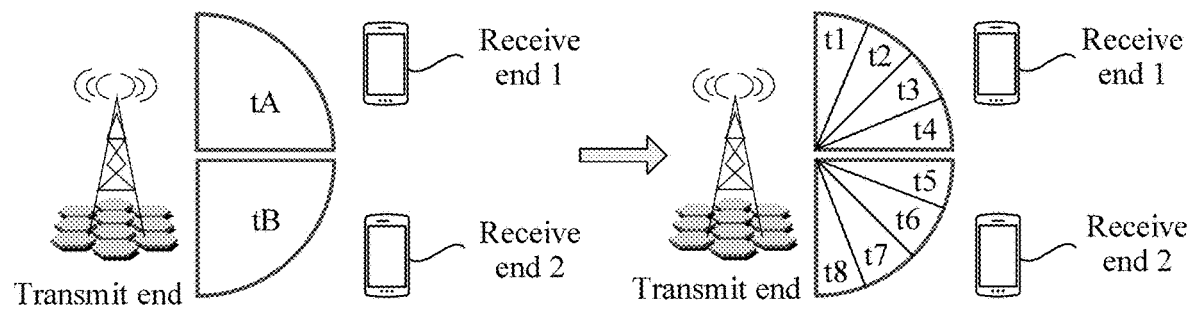
FIG. 2 is a schematic diagram of a procedure from sector beam coarse sweeping to fine sweeping according to an embodiment of the present application.

To resolve the foregoing problem that determining a best transmit/receive beam by sweeping all narrow beams in a traversal manner consumes a long time and has low efficiency, a hierarchical sweeping policy is used, that is, sweeping is performed from wider beams to narrower beams, in this embodiment of the present application. FIG. 2 is a schematic diagram of a procedure from sector beam coarse sweeping to fine sweeping according to an embodiment of the present application. An implementation process is as follows.

In a first phase, coarse sweeping is performed. A transmit end, for example, a base station, uses a small quantity of wide beams to cover an entire cell, and sequentially sweeps alignment directions of the wide beams. In FIG. 2, the base station uses wide beams tA and tB in this phase, and aligns only wide beams for a receive end. Alignment direction precision is not high, and quality of an established wireless communication connection is also relatively limited.

In a second phase, fine sweeping is performed. The base station sweeps, one by one using a plurality of narrow beams, directions that have been covered by the wide beams in the first phase. For a single user (the receive end), although a to-be-swept beam becomes narrower in this case, a range within which sweeping needs to be performed is narrowed, and a quantity of sweeping times is correspondingly reduced. As shown in FIG. 2, on the basis of alignment of the wide beams in the first phase, the base station only needs to continue to finely sweep four narrow beams related to each user, for example, sweep beams t1 to t4 for a user 1 and sweep beams t5 to t8 for a user 2. In this case, the base station improves precision of aligning a beam direction for each user, and quality of the established wireless communication connection is improved. Therefore, in a two-level beam management process shown in FIG. 2, the base station only needs to perform sweeping for each user for six times, and does not need to sweep all eight narrow beams.

A larger quantity of radiating elements indicates a finer beam, and a smaller quantity of radiating elements indicates a wider beam. If a conventional beam increasing manner is used, for example, 4*4 radiating elements in an antenna array of N rows and M columns are used for coarse sweeping, to obtain a beam with same widths in a horizontal direction and a vertical direction, and then sweeping is performed along a Z shape within a sweeping range. To be specific, a quantity of radiating elements in the antenna array is reduced for sweeping. In this way, a quantity of to-be-swept beams can be reduced, and a beam alignment time can be reduced. However, because the radiating elements are evenly arranged, beam widths are the same in the vertical direction and the horizontal direction in a coarse sweeping process. Therefore, a relatively complex beam sweeping manner (generally, a Z-shaped sweeping manner in which an array center is used as a center of a circle and a radius gradually changes) is needed to complete coarse sweeping with relatively many beam configurations (sector ID), and not only a quantity of sweeping times is large, but also a beam direction range with a smaller alignment range cannot be obtained. Therefore, a sweeping range in a subsequent fine sweeping process cannot be further reduced, and beam alignment efficiency cannot be effectively improved. In addition, if a beam width needs to meet a width range in the coarse sweeping process, a value of X in X*X radiating elements may be limited, to be specific, the value of X may need to be relatively small to meet a requirement that a to-be-coarsely-swept beam is relatively wide. However, when the value of X is relatively small, for example, when X=4, an EIRP of the 4*4 radiating elements may be relatively low, and cannot meet a link requirement for long-distance communication between a transmit end and a receive end.

Therefore, this embodiment of the present application further needs to resolve how to ensure beam sweeping quality, increase a beam alignment speed and improve alignment efficiency, and improve communication efficiency while further reducing a quantity of beam sweeping times in a beam alignment sweeping process of a large array.

Figure 3:
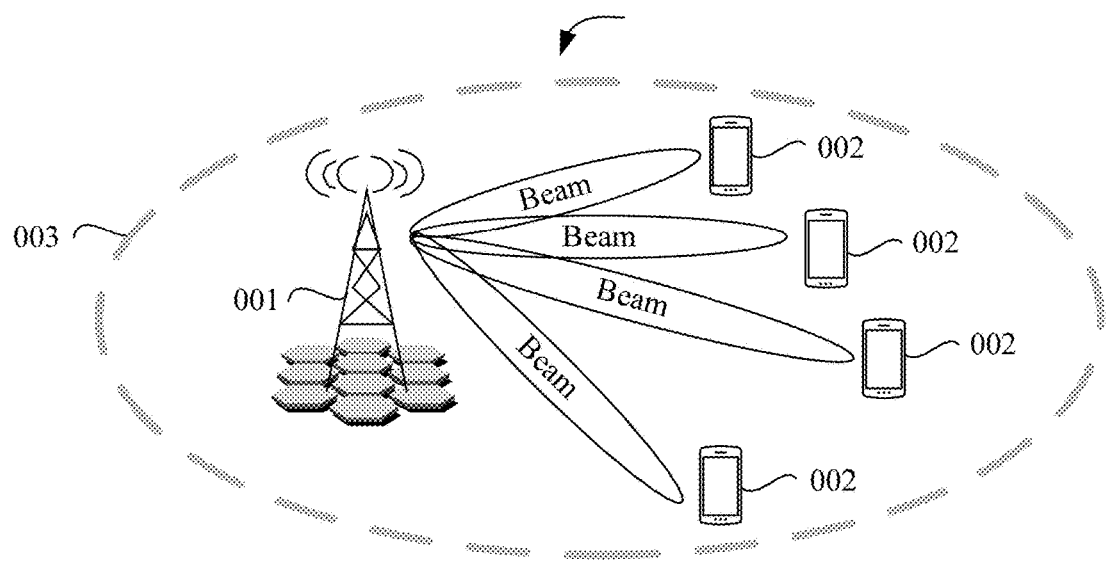
FIG. 3 is an architectural diagram of a wireless communications system according to an embodiment of the present application.

Based on the foregoing descriptions, the following first describes an architecture of a communications system on which the embodiments of the present application are based. FIG. 3 is an architectural diagram of a wireless communications system according to an embodiment of the present application. The wireless communications system 00 may include one or more network devices 001 and one or more terminal devices 002. The network device may be used as a transmit end or a receive end in a beam alignment system. Similarly, the terminal device 002 may be used as a receive end or a transmit end. This is not limited in this application.

The network device 001 may be the antenna apparatus in this application, or may be configured as a device including the antenna apparatus in this application, and generates beams with different directions using the antenna apparatus, to cover an entire cell 003. For example, in a downlink communication process, the network device 001 may sequentially generate beams with different directions to transmit radio signals, to communicate with the terminal devices 002 in different directions. Optionally, the network device 001 may be a base station. The base station may be a BTS in a TD-SCDMA system, an eNB in an LTE system, or a base station in a 5G system or in an NR system. Alternatively, the base station may be an AP, a Trans TRP, a CU, or another network entity, and may include some or all of functions of the foregoing network entity.

The terminal devices 002 may be distributed in the entire wireless communications system 00, and may be static or mobile. In some embodiments of this application, the terminal device 002 may be a mobile device, a mobile station, a mobile unit, an M2M terminal, a radio unit, a remote unit, a terminal agent, a mobile client, or the like. In a future communications system, the terminal device 002 may alternatively be the antenna apparatus in this application, or may be configured as a terminal device including the antenna apparatus in this application. For example, the terminal device 002 generates beams with different directions using the antenna apparatus, and performs uplink communication with the network device 001, or performs M2M communication with another terminal device 002, or the like. That is, in the wireless communications system 00, both the network device 001 and the terminal device 002 may perform beam alignment and multi-beam communication using the antenna apparatus in this application.

The wireless communications system 00 shown in FIG. 3 may operate on a high frequency band, and is not limited to an LTE system, a future evolved 5G mobile communications system, an NR system, an M2M communications system, or the like.

It may be understood that the architecture of the wireless communications system in FIG. 3 is only an example of an implementation in the embodiments of the present application, and the architecture of the communications system in the embodiments of the present application includes but is not limited to the foregoing architecture of the communications system.

Based on the foregoing wireless communications system and with reference to the embodiments of the antenna apparatus provided in this application, the following analyzes and resolves the technical problem proposed in this application.

Figure 4:
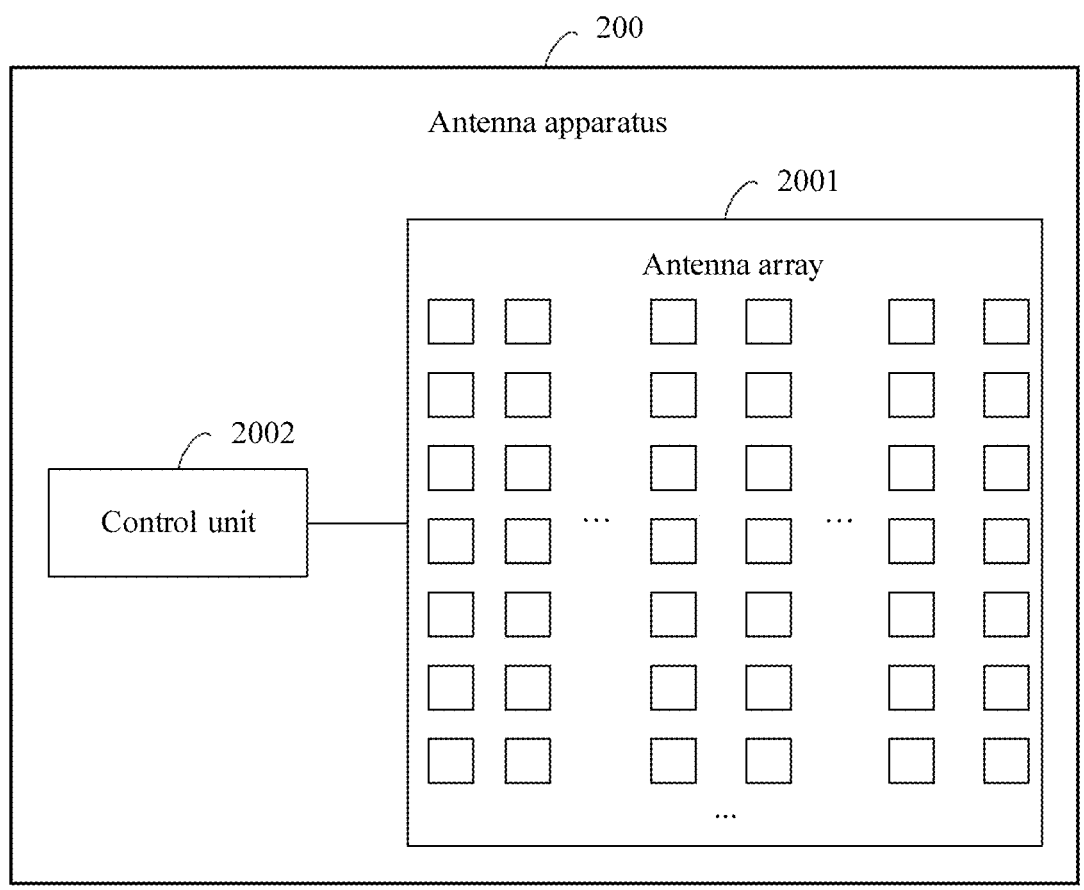
FIG. 4 is a structural diagram of an antenna apparatus according to an embodiment of the present application.

FIG. 4 is a structural diagram of an antenna apparatus according to an embodiment of the present application. As shown in FIG. 4, an antenna apparatus 200 includes an antenna array 2001 and a control unit 2002, and the control unit 2002 and the antenna array 2001 may be connected through a bus or in another manner.

Figure 5:
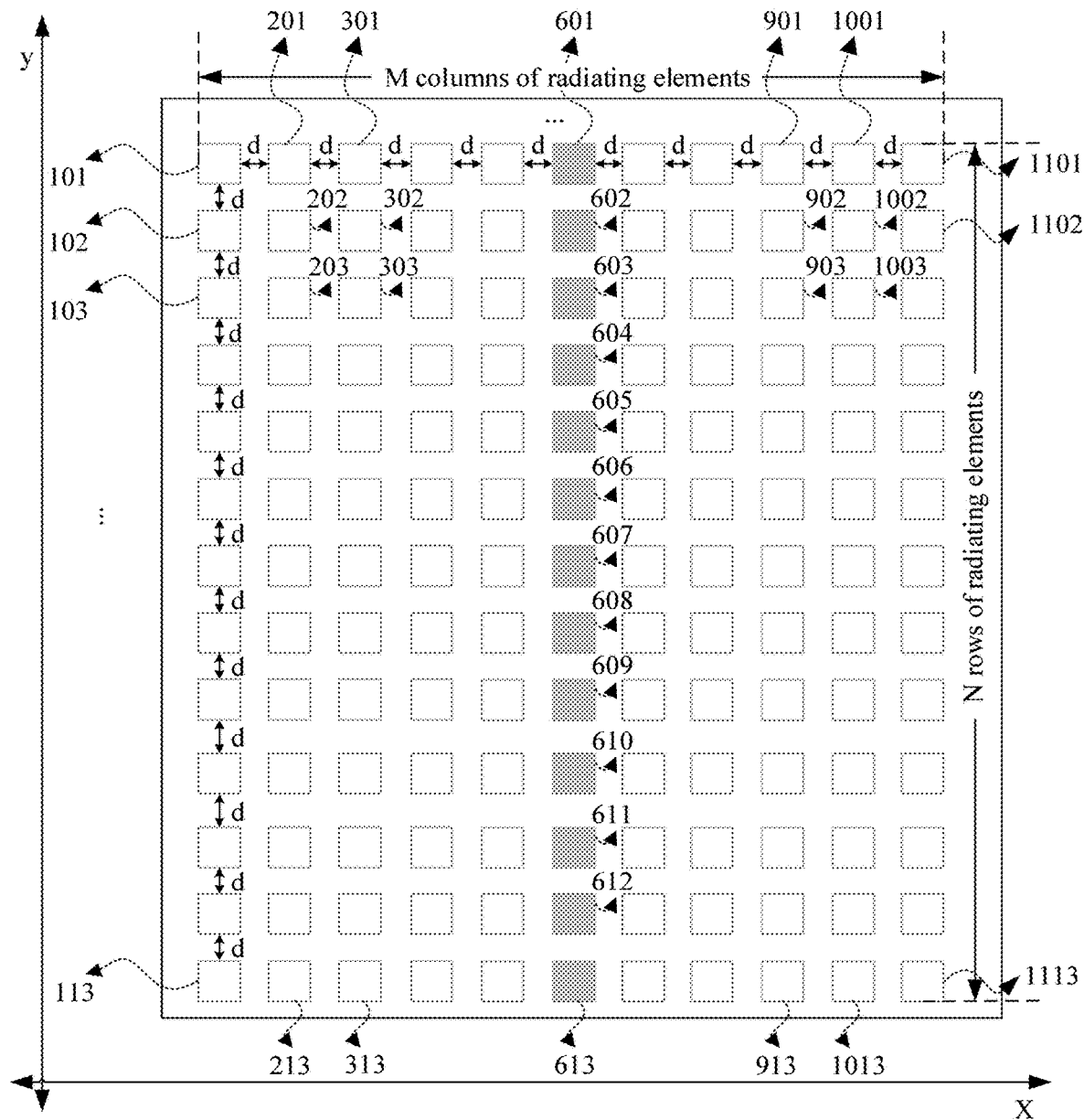
FIG. 5 is a schematic structural diagram of a rectangular antenna array according to an embodiment of the present application.

The antenna array 2001 includes at least N rows and M columns of radiating elements. The antenna array in this application may alternatively be a triangular array, a hexagon array, a rhombus array, a circular array, or the like. Therefore, at least the N rows and M columns of radiating elements included in the antenna array in this application may be included in some of the foregoing arrays of various forms. Optionally, in the foregoing arrays of various forms, positions of N rows of radiating elements are perpendicular to positions of M columns of radiating elements in this application. FIG. 5 is a schematic structural diagram of a rectangular antenna array according to an embodiment of the present application. The rectangular antenna array includes N rows and M columns of radiating elements.

A control unit 2002 determines a first antenna subarray from the N rows and M columns of radiating elements, where the first antenna subarray includes X1 rows and Y1 columns of radiating elements, X1 and Y1 are integers greater than or equal to 1, and X1 is greater than Y1, controls a phase shift increment change of the first antenna subarray to generate a plurality of first beams, where different phase shift increments correspond to different first beams, and determines a first aligned beam from the plurality of first beams based on a feedback from a receive end. For example, as shown in FIG. 5, the first antenna subarray includes the sixth column in the middle of the rectangular antenna array. In this case, X1=13, and Y1=1. Alternatively, the first antenna subarray includes the sixth column and the seventh column of the rectangular antenna array. In this case, X1=13, and Y1=2. In the foregoing two cases, in the X1 rows and Y1 columns of radiating elements included in the first antenna subarray, X1 is far greater than Y1. Therefore, a beam that is relatively wide in a row direction and relatively narrow in a column direction can be generated. In a process in which the control unit 2002 controls the phase shift increment (progressive phase shift) change of the first antenna subarray, the first antenna subarray has a same phase shift increment change at a same moment, that is, the first antenna subarray jointly generates a first beam under a condition of the same phase shift increment. It may be understood that the first antenna subarray may be at an edge position or a middle position in the antenna array, and a specific position of the first antenna subarray in the antenna array is not limited.

In this embodiment of the present application, based on a hardware structure of the antenna array in the other approaches, the control unit in the antenna apparatus controls the phase shift increment change of the first antenna subarray in the antenna array, to generate the plurality of first beams. The first antenna subarray includes the X1 rows and Y1 columns of radiating elements, where X1 is greater than Y1. This indicates that a quantity of radiating elements of the antenna subarray in a column direction is greater than a quantity of radiating elements in a row direction. A smaller quantity of radiating elements indicates a wider beam, and a larger quantity of radiating elements indicates a narrower beam. A beam width of the first beam generated by the first antenna subarray in the row direction is greater than a beam width in the column direction. Therefore, the finally determined first aligned beam is also within a direction range that is relatively wide in the row direction and relatively narrow in the column direction. In conclusion, in this embodiment of the present application, the first antenna subarray is controlled to form a beam that is relatively wide in the row direction and relatively narrow in the column direction. Therefore, a quantity of sweeping times in a wide beam direction (that is, the row direction) can be greatly reduced, and a direction range of an aligned beam in a narrow beam direction (that is, the column direction) can be effectively narrowed.

In a possible implementation, when Y1 is greater than or equal to 2, a column spacing between any two adjacent columns of radiating elements in Y1 columns of radiating elements is d1, and $\lambda/4 \leq d1 \leq \lambda$. For example, as shown in FIG. 5, when the first antenna subarray includes the sixth column and the seventh column of the rectangular antenna array, X1=13, and Y1=2. When a spacing between two antenna subarrays is greater than one time a wavelength, a grating lobe in a direction is generated. Therefore, in this embodiment of the present application, in the first antenna subarray, a range of a spacing between columns of radiating elements is set to a range smaller than $\lambda/4 \leq d1 \leq \lambda$, to prevent the first beam from forming a grating lobe in the row direction, and ensure a better waveform and better beam quality of the first beam.

In a possible implementation, each of the X1 columns of radiating elements in the first antenna subarray includes at least two first radiating elements, a spacing between any two adjacent first radiating elements in the at least two first radiating elements is d1, and $\lambda/4 \leq d1 \leq \lambda$. As shown in FIG. 5, for example, when the first antenna subarray includes the sixth column of radiating elements (601, 602, and 603 to 613), a row spacing between adjacent radiating elements such as 601 and 602 in the sixth column of radiating elements is d1, and $\lambda/4 \leq d1 \leq \lambda$. As shown in FIG. 5, for example, when the first antenna subarray includes the sixth column (601, 602, and 603 to 613) and the seventh column (701, 702, and 703 to 713) of radiating elements in the antenna array, in the sixth column and the seventh column of radiating elements, a row spacing between adjacent radiating elements 601 and 602 and a row spacing between adjacent radiating elements 701 and 702 are d1, and $\lambda/4 \leq d1 \leq \lambda$. That is, in this embodiment of the present application, in the first antenna subarray, a range of a spacing between rows in each column of radiating elements is set to a range less than $\lambda/4 \leq d1 \leq \lambda$, to ensure quality of the first beam. When the spacing d1 is less than ¼ of the wavelength, the radiating elements are connected together. Excessively strong antenna coupling is unfavorable to radiation. If the spacing is greater than one time the wavelength, a grating lobe occurs. Therefore, $\lambda/4 \leq d1 \leq \lambda$ can ensure that a grating lobe is not formed on the first beam in a first direction, and ensure that a waveform and beam quality of the first beam are better.

In a possible implementation, any two radiating elements in a same row in the first antenna subarray have an equal phase, and any two rows of adjacent radiating elements in the first antenna subarray have an equal phase difference at a same moment. For example, as shown in FIG. 5, the first antenna subarray includes the sixth column (601, 602, and 603 to 613) and the seventh column (701, 702, and 703 to 713) of radiating elements. In this embodiment of the present application, phases of 601 and 701 are equal. Similarly, phases of 602 and 702 are also equal. The rest can be deduced by analogy. That is, at a same moment, radiating elements in each row have an equal phase. In addition, a phase difference between 601 and 602, a phase difference between 602 and 603, a phase difference between 603 and 604, and the like are equal at a same moment. Similarly, a phase difference between 701 and 702 and a phase difference between 702 and 703 are equal. The rest can be deduced by analogy. That is, any two rows of adjacent radiating elements in the first antenna subarray have an equal phase difference at a same moment. Because to-be-swept beams with a plurality of directions are generated according to a principle of a phased array in this embodiment of the present application, a phase of each radiating element in the first antenna array and a phase difference between radiating elements are set using a phase shift increment in a phased antenna array, to generate the plurality of first beams with different directions.

Figure 6:
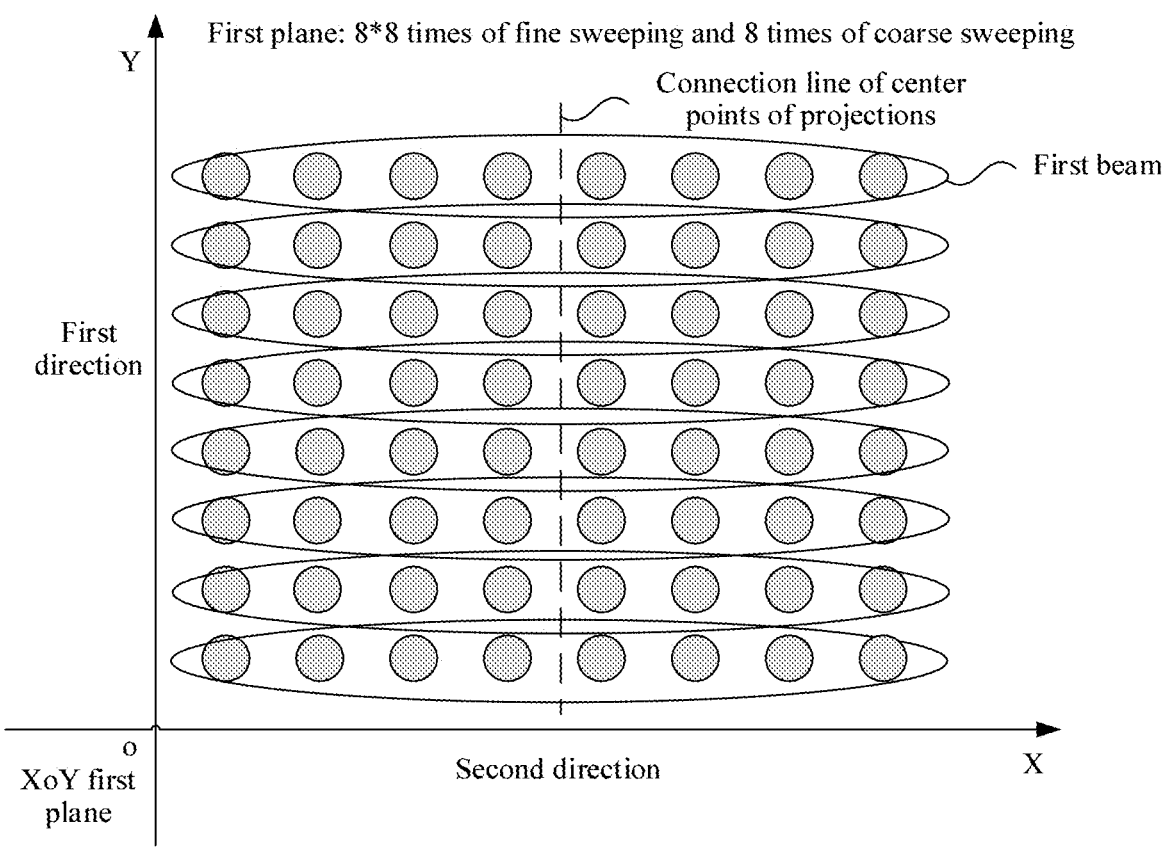
FIG. 6 is a schematic diagram of projections of a plurality of first beams on a first plane according to an embodiment of the present application.

In a possible implementation, the antenna array is located on a first plane, and a line formed by connecting center points of projections of the plurality of first beams on the first plane is in the first direction, and the first direction is parallel to a column direction of the X1 rows and Y1 columns of radiating elements. FIG. 6 is a schematic diagram of projections of a plurality of first beams on a first plane according to an embodiment of the present application. In FIG. 6, for example, 8*8 projection circles are projections of to-be-finely-swept beams on the first plane in the other approaches, eight ellipses in the figure are projection circles of eight first beams in this embodiment of the present application. Each first beam may cover an entire row of projection circles for fine sweeping, that is, cover a sweeping range of one row. It may be understood that the first beam is not an ellipse in a strict sense, but is similar to an ellipse in shape. Therefore, for ease of description, the ellipse is used for description. A line formed by connecting center points of projections of the plurality of first beams on the first plane is in a first direction, and the first direction is parallel to a column direction of Y1 columns of radiating elements. It can be learned from FIG. 6 that because each first beam is a wide beam in a row direction, a projection of each first beam on the first plane is an ellipse (or similar to an ellipse) including a plurality of circles, and the elliptic projection may cover, in the row direction, a plurality of (eight in FIG. 6) projection circles of beams to be swept point by point in the other approaches. Therefore, when the line formed by connecting the center points of the projections of the plurality of first beams on the first plane is parallel to the column direction, that is, the first direction, narrow beams to be swept point by point in the other approaches may be covered by a minimum quantity of first beams within an area range. In this way, the first aligned beam can be obtained through a minimum quantity of sweeping times.

Figure 7:
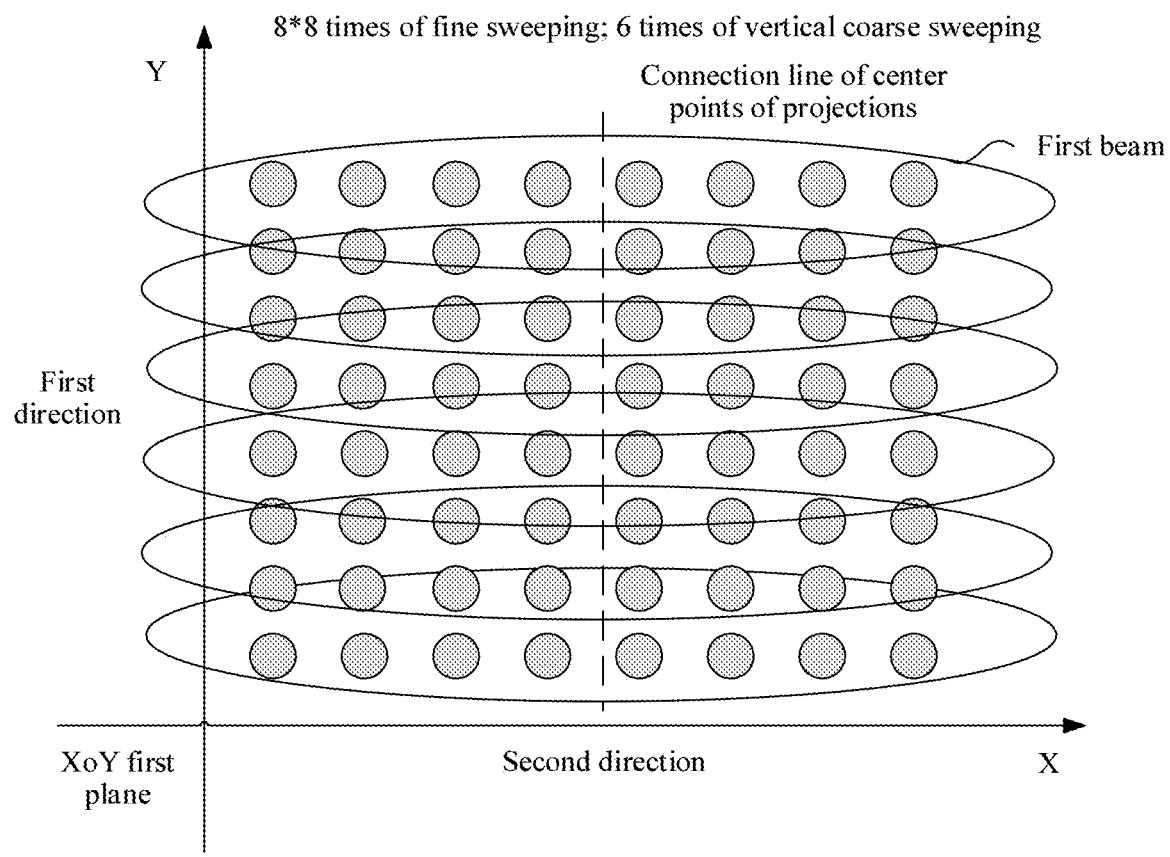
FIG. 7 is a schematic diagram of projections, on a first plane, of a plurality of first beams on which Hanning window weighting has been performed according to an embodiment of the present application.

In a possible implementation, the control unit 2002 is further configured to perform Hanning window weighting processing on amplitudes controlled by power amplifiers in each column of radiating elements in the first antenna subarray. FIG. 7 is a schematic diagram of projections, on a first plane, of a plurality of first beams on which Hanning window weighting has been performed according to an embodiment of the present application. In FIG. 7, a width of the first beam in a vertical direction of a first direction, that is, in a second direction may be increased after Hanning window weighting processing is performed. Therefore, a quantity of to-be-coarsely-swept beams in a range may be further reduced, and sweeping efficiency is improved. In this embodiment of the present application, in a vertical coarse sweeping process, Hanning window processing is performed on radiating elements in the first antenna subarray in the column direction, to increase a width of the first beam in the column direction, thereby reducing a quantity of times of sweeping the first beam in the column direction, and reducing a sweeping time.

After coarse sweeping is performed in the vertical direction, a rough range corresponding to an aligned beam, that is, a range corresponding to a first aligned beam, for example, a sweeping range corresponding to a projection ellipse in FIG. 6 or FIG. 7, may be roughly determined. After the range of the first aligned beam is obtained, further fine sweeping may be directly performed. For example, fine sweeping may be directly performed in a coarse sweeping ellipse range corresponding to FIG. 6 or FIG. 7 such that a to-be-finely-swept aligned beam with a same granularity as that in the other approaches can be determined. Further, an embodiment of the present application further provides a solution in which coarse sweeping continues to be performed in a horizontal direction based on coarse sweeping in the vertical direction, to further reduce a range of an aligned beam.

Figure 8:
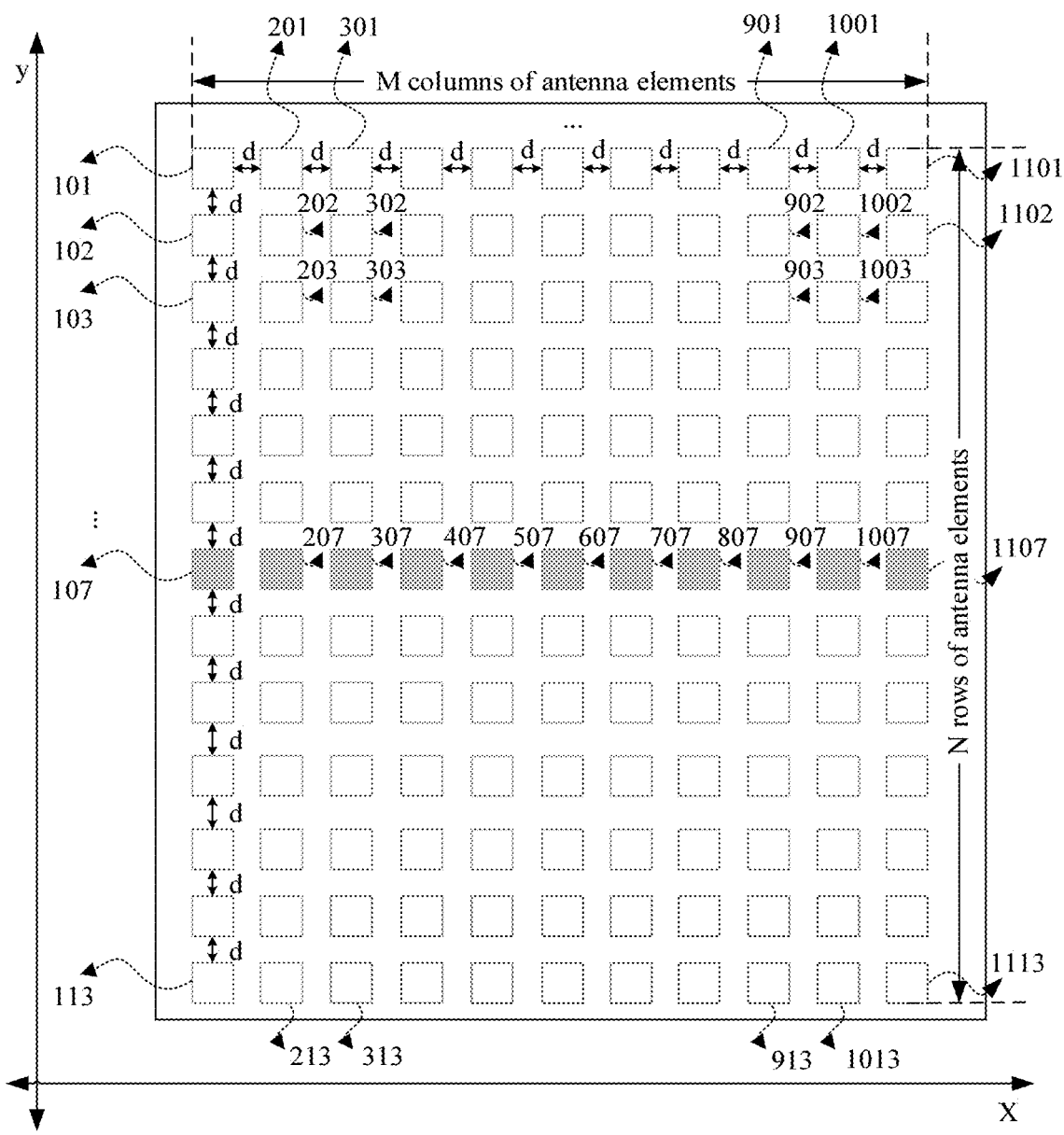
FIG. 8 is a schematic structural diagram of another rectangular antenna array according to an embodiment of the present application.

In a possible implementation, the control unit 2002 is further configured to determine a second antenna subarray from the N rows and M columns of radiating elements, where the second antenna subarray includes X2 rows and Y2 columns of radiating elements, $1 \leq X2 \leq N$, $1 \leq Y2 \leq M$, and $Y2 > X2$, control a phase shift increment change of the second antenna subarray to generate a plurality of second beams, where different phase shift increments correspond to different second beams, and determine a second aligned beam from the plurality of second beams based on a feedback from the receive end. FIG. 8 is a schematic structural diagram of another rectangular antenna array according to an embodiment of the present application. For example, the second antenna subarray includes the seventh row (107, 207, 307, and 407 to 1107) in the middle of a rectangular antenna array, or includes the seventh row (107, 207, 307, and 407 to 1107) and the eighth row (108, 208, 308, and 408 to 1108). In a process in which the phase shift increment change of the second antenna subarray is controlled, the second antenna subarray has a same phase shift increment change at a same moment, that is, the second antenna subarray jointly generates a second beam under a condition of the same phase shift increment. In this embodiment of the present application, based on the first aspect, the beam that is relatively wide in the row direction and relatively narrow in the column direction is generated using a feature that a quantity of radiating elements in the column direction in the first antenna subarray is greater than a quantity of radiating elements in the row direction. Because the beam width in the row direction can directly cover a sweeping range in the row direction, a quantity of sweeping times in the row direction is greatly reduced. Further, a beam that is relatively wide in the column direction and relatively narrow in the row direction is generated using a feature that a quantity of radiating elements in the row direction in the second antenna subarray is greater than a quantity of radiating elements in the column direction. Because the beam width in the column direction covers an original sweeping range in the column direction, a quantity of sweeping times in the column direction is greatly reduced. In conclusion, in this embodiment of the present application, beam sweeping is respectively performed in a vertical direction and a horizontal direction using the first beam (which is wide in the row direction and narrow in the column direction) and the second beam (which is wide in the column direction and narrow in the row direction), to obtain the first aligned beam and the second aligned beam, and a beam direction range that is relatively narrow in both the row direction and the column direction may be finally determined based on a direction range in which the first aligned beam intersects with the second aligned beam. In this way, an alignment direction area with a relatively precise range can be determined through a relatively small quantity of beam sweeping times, thereby improving beam alignment efficiency.

It may be understood that there may be an overlapping radiating element between the first antenna subarray and the second antenna subarray, or there may be no overlapping radiating element between the first antenna subarray and the second antenna subarray.

In a possible implementation, when X2 is greater than or equal to 2, a row spacing between any two adjacent rows of radiating elements in X2 rows of radiating elements is d3, and $\lambda/4 \leq d3 \leq \lambda$. For example, as shown in FIG. 5, when the second antenna subarray includes the seventh row (107, 207, 307, and 407 to 1107) and the eighth row (108, 208, 308, and 408 to 1108), a spacing between 107 and 108 is d3, and a spacing between 207 and 208 is d3, and $\lambda/4 \leq d3 \leq \lambda$. The rest can be deduced by analogy. In this embodiment of the present application, in the second antenna subarray, a range of a spacing between columns of radiating elements is set to a range smaller than $\lambda/4 \leq d3 \leq \lambda$, to prevent the second beam from forming a grating lobe in the row direction, and ensure a better waveform and better beam quality of the second beam.

In a possible implementation, each of the Y2 rows of radiating elements includes at least two second radiating elements, a column spacing between any two adjacent columns of second radiating elements in the at least two second radiating elements is d4, and $\lambda/4 \leq d4 \leq \lambda$. As shown in FIG. 5, for example, when the second antenna subarray includes the seventh row (107, 207, 307, and 407 to 1107), a spacing between 107 and 207 is d4, and a spacing between 207 and 307 is d4, and $\lambda/4 \leq d4 \leq \lambda$. In this embodiment of the present application, in the second antenna subarray, a range of a row spacing between adjacent radiating elements in any column of radiating elements is set to a range smaller than $\lambda/4 \leq d4 \leq \lambda$, to prevent the second beam from forming a grating lobe in the column direction, and ensure a better waveform and better beam quality of the first beam.

In a possible implementation, any two radiating elements in a same column in the second antenna subarray have an equal phase, and any two columns of adjacent radiating elements in the second antenna subarray have an equal phase difference at a same moment. For example, as shown in FIG. 8, the second antenna subarray includes two rows, the seventh row (107, 207, 307, and 407 to 1107) and the eighth row (108, 208, 308, and 408 to 1108), of radiating elements. Phases of 107 and 108 are equal, and similarly, phases of 207 and 208 are also equal. The rest can be deduced by analogy. That is, at a same moment, any two radiating elements in a same column have an equal phase. In addition, a phase difference between 101 and 207 and a phase difference between 207 and 307 are equal at a same moment. Similarly, a phase difference between 108 and 208 and a phase difference between 208 and 308 are equal. The rest can be deduced by analogy. That is, any two columns of adjacent radiating elements in the second antenna subarray have an equal phase difference at a same moment.

Figure 9:
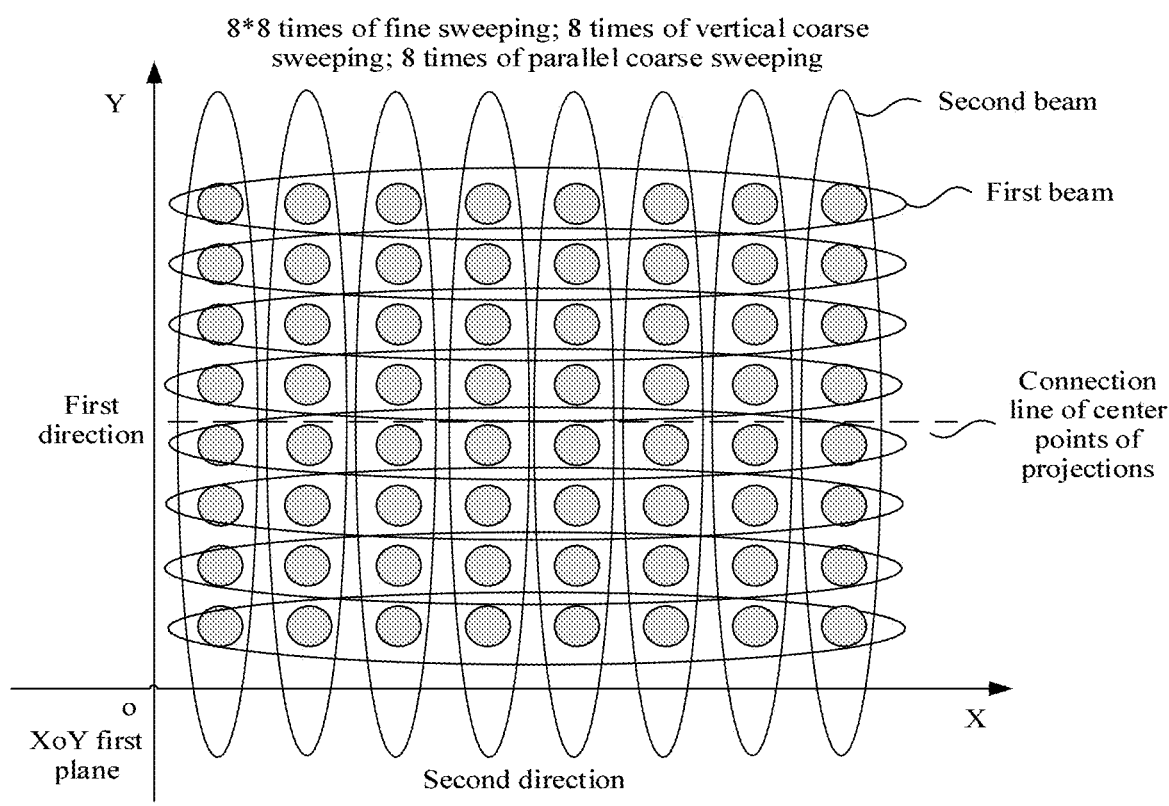
FIG. 9 is a schematic diagram of projections of a plurality of second beams on a first plane according to an embodiment of the present application.

In a possible implementation, the antenna array is located on a first plane, and a line formed by connecting center points of projections of the plurality of second beams on the first plane is in a second direction, and the second direction is parallel to a row direction of the X2 rows and Y2 columns of radiating elements. FIG. 9 is a schematic diagram of projections of a plurality of second beams on a first plane according to an embodiment of the present application. In FIG. 8, for example, 8*8 projection circles are projections of to-be-finely-swept beams on the first plane in the other approaches, eight transverse ellipses in FIG. 8 are eight first beams in this embodiment of the present application. Each first beam may cover an entire row of projection circles for fine sweeping, that is, cover a sweeping range of one row. Eight longitudinal ellipses in FIG. 9 are eight second beams in this embodiment of the present application. Each second beam may cover an entire column of to-be-finely-swept projection circles, that is, cover a sweeping range of one column. It may be understood that the second beam is not an ellipse in a strict sense, but is similar to an ellipse in shape. Therefore, for ease of description, the ellipse is used for description. A line formed by connecting center points of projections of the plurality of second beams on the first plane is in a second direction, and the second direction is parallel to a row direction of X2 rows of radiating elements. It can be learned from FIG. 9 that because each second beam is a wide beam in a column direction, a projection of each second beam on the first plane is an ellipse (similar to an ellipse) including a plurality of circles, and the elliptic projection may cover, in the row direction, a plurality of (eight in FIG. 9) projection circles of beams to be swept point by point in the other approaches. Therefore, when the line formed by connecting the center points of the projections of the plurality of second beams on the first plane is parallel to the row direction, that is, the second direction, narrow beams to be swept point by point in the other approaches may be covered by a minimum quantity of first beams within an area range. In this way, the first aligned beam can be obtained through a minimum quantity of sweeping times.

Figure 10:
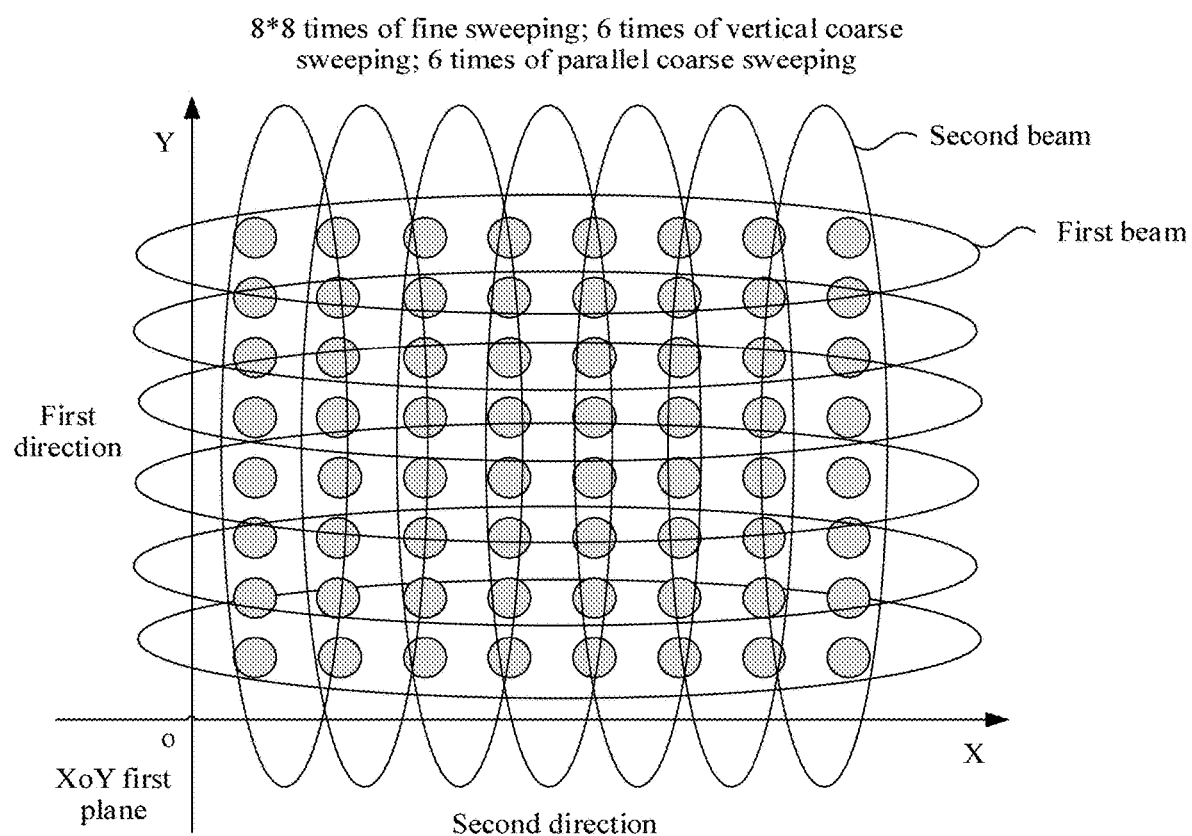
FIG. 10 is a schematic diagram of projections, on a first plane, of a plurality of second beams on which Hanning window weighting has been performed according to an embodiment of the present application.

In a possible implementation, the control unit 2002 is further configured to perform Hanning window weighting processing on amplitudes controlled by power amplifiers in each row of radiating elements in the second antenna subarray. FIG. 10 is a schematic diagram of projections, on a first plane, of a plurality of second beams on which Hanning window weighting has been performed according to an embodiment of the present application. In FIG. 10, a width of the second beam in a vertical direction of a second direction, that is, in a first direction may be increased after Hanning window weighting is performed. Therefore, a quantity of to-be-coarsely-swept beams in a range may be further reduced, and sweeping efficiency is improved. In this embodiment of the present application, in a horizontal coarse sweeping process, Hanning window processing is performed on radiating elements in the first antenna subarray in a row direction, to increase a width of the second beam in the row direction, thereby reducing a quantity of times of sweeping the second beam in the row direction, and reducing a sweeping time.

Coarse sweeping in the vertical direction and the horizontal direction may further reduce a range of an aligned beam, for example, a sweeping range corresponding to an area in which a projection ellipse in the vertical direction intersects a projection in the horizontal direction in FIG. 8 and FIG. 9. After the range of the aligned beam is further reduced, a finely swept beam with a same granularity as that in the other approaches may be used for sweeping, to finally determine an aligned narrow beam. Therefore, in this embodiment of the present application, after coarse sweeping in the vertical direction and coarse sweeping in the horizontal direction are performed, fine sweeping is performed using a narrow beam with a finer granularity, to obtain a final direction range of an aligned narrow beam.

In a possible implementation, the control unit 2002 is further configured to determine a third antenna subarray from the N rows and M columns of radiating elements, where the third antenna subarray includes X3 rows and Y3 columns of radiating elements, $X1 \leq X3 \leq N$, and $Y2 \leq Y3 \leq M$, control the third antenna subarray to generate, based on different phase shift increments, a plurality of third beams with different directions, where centers of circles of projections of the plurality of third beams on the first plane are within an alignment area, and the alignment area is an area in which a projection of the first aligned beam on the first plane intersects a projection of the second aligned beam on the first plane, and determine a third aligned beam from the plurality of third beams based on a feedback from the receive end. To be specific, fine sweeping is performed on the third beams through to-be-finely-swept beams in an area range determined in the first coarse sweeping and the second coarse sweeping. A specific rule may be that projections of all the third beams on the first plane are within the alignment area, or centers of projection circles of all the third beams are within the alignment area. In this embodiment of the present application, based on a direction range of the aligned beam determined through wide beam sweeping in the vertical direction and the horizontal direction, a direction of the aligned beam is further determined in the direction range in a fine sweeping manner, to perform more precise beam alignment.

In a possible implementation, the third antenna subarray includes the N rows and M columns of radiating elements. Because a larger quantity of radiating elements indicates a finer beam, in this embodiment of the present application, a narrow beam may be formed by controlling phase shift increment changes of the N rows and M columns of radiating elements included in the antenna array, and more precise fine sweeping is performed within a coarse sweeping range.

In a possible implementation, a beam width of the first beam in the first direction is K, and sweeping steps of the plurality of first beams are K/2. Optionally, a beam width of the second beam in the second direction is K, and sweeping steps of the plurality of second beams are K/2. In this embodiment of the present application, in the vertical and/or horizontal sweeping direction, the sweeping step is set to half of a width of an equivalent wide beam, to improve sweeping precision in the vertical direction and the horizontal direction and avoid missing sweeping an aligned beam.

In a possible implementation, a beam width of the third beam in the first direction or the second direction is L, the sweeping steps of the plurality of first beams are L/2, and L<K. In this embodiment of the present application, in a fine sweeping process, the sweeping step is set to half of the beam width such that sweeping precision of fine sweeping can be improved. In addition, because a width of the to-be-finely-swept beam is less than the width of the first beam or the second beam, a finer beam may be used to perform more precise sweeping after coarse sweeping, and finally, an aligned beam with higher precision is determined.

Next, with reference to a specific structure of the control unit 2002, how the antenna apparatus in this application implements first coarse sweeping and then fine sweeping is described using an example. Beam sweeping includes four steps initial beam sweeping setting, beam sweeping in a vertical (or horizontal) direction, beam sweeping in a horizontal (or vertical) direction, and narrow beam fine sweeping.

Step 1: Perform initial beam sweeping setting.

Figure 11:
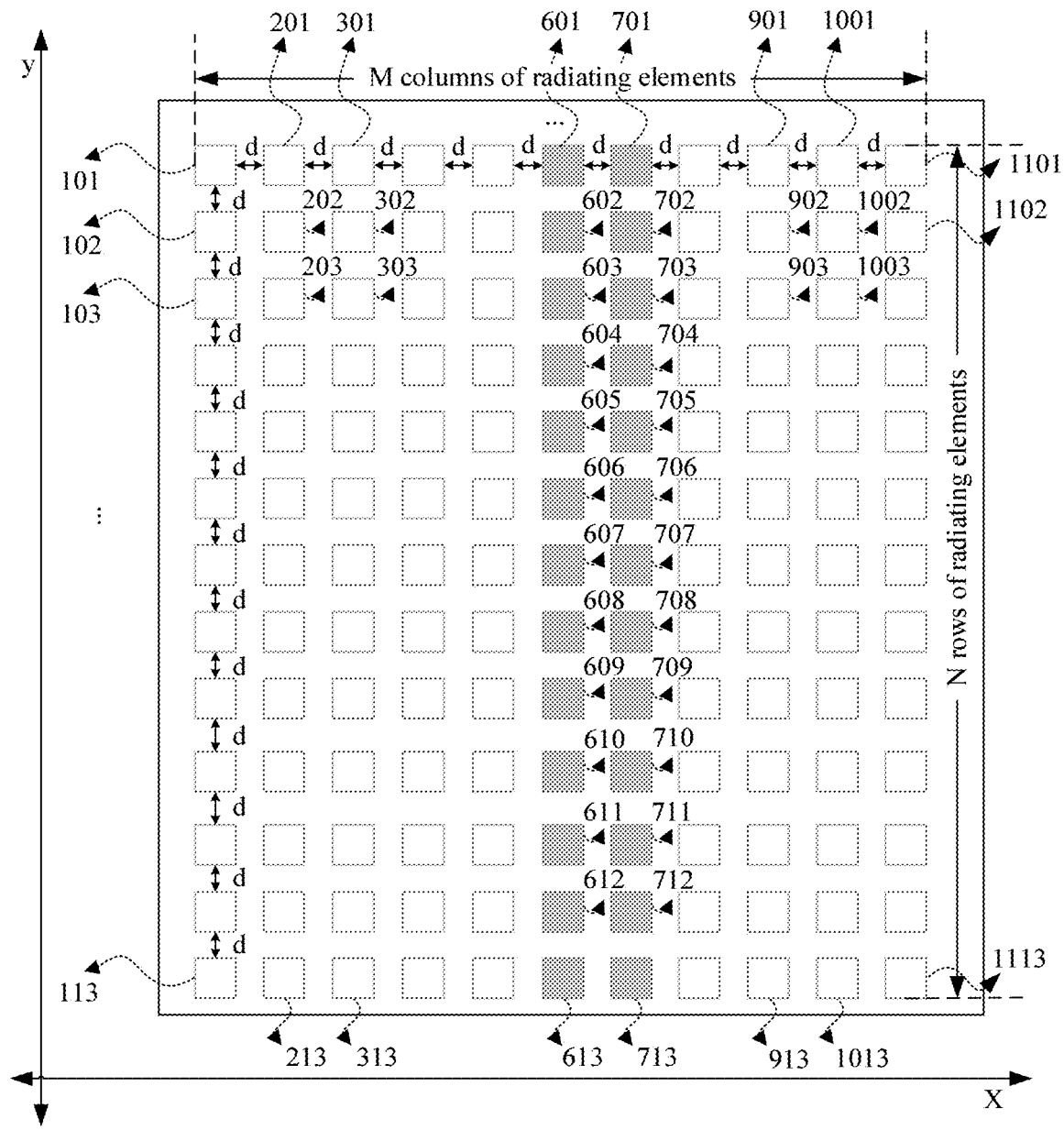
FIG. 11 is a schematic diagram of an antenna array in which a first antenna subarray is turned on according to an embodiment of the present application.

FIG. 11 is a schematic diagram of an antenna array in which a first antenna subarray is turned on according to an embodiment of the present application. The antenna array is located in the antenna apparatus (for example, a base station) in the embodiments of the present application. When the base station serves as a transmit end, an antenna array on one substrate of the base station includes N rows*M columns of radiating elements. To be specific, each row in a horizontal direction has M radiating elements, each column in a vertical direction has N radiating elements. A spacing between every two adjacent antennas is d. That is, in either the horizontal direction or the vertical direction, a spacing between radiating elements is d≈λ₀/2, where λ₀ represents an antenna wavelength. In FIG. 11, X1=13, and Y1=2.

Step 2: Perform beam sweeping in the vertical direction (beam sweeping first in the vertical direction is used as an example). This step includes (1) initial beam setting in the vertical direction and (2) beam sweeping in the vertical direction.

(1) Initial beam setting in the vertical direction includes two parts: 1. turning on and turning off of an element in the array, and 2. weighting of the element in the array. The two parts are both related to configuration of a front-end circuit of the radiating element.

1. Turning on and turning off of an element in the array: The antenna array includes a total of M (M=11 is used as an example in FIG. 11) columns of elements in a horizontal direction (an x direction) and a total of N (N=13 is used as an example in FIG. 11) columns of elements in a vertical direction (a y direction). As shown in FIG. 11, the first antenna subarray includes radiating elements 601, 602, 603 to 613, 701, 702, and 703 to 713. In the first antenna subarray, a spacing in the y direction (that is, a first direction) is d, and a spacing in the x direction (that is, a second direction) is also d.

Figure 12:
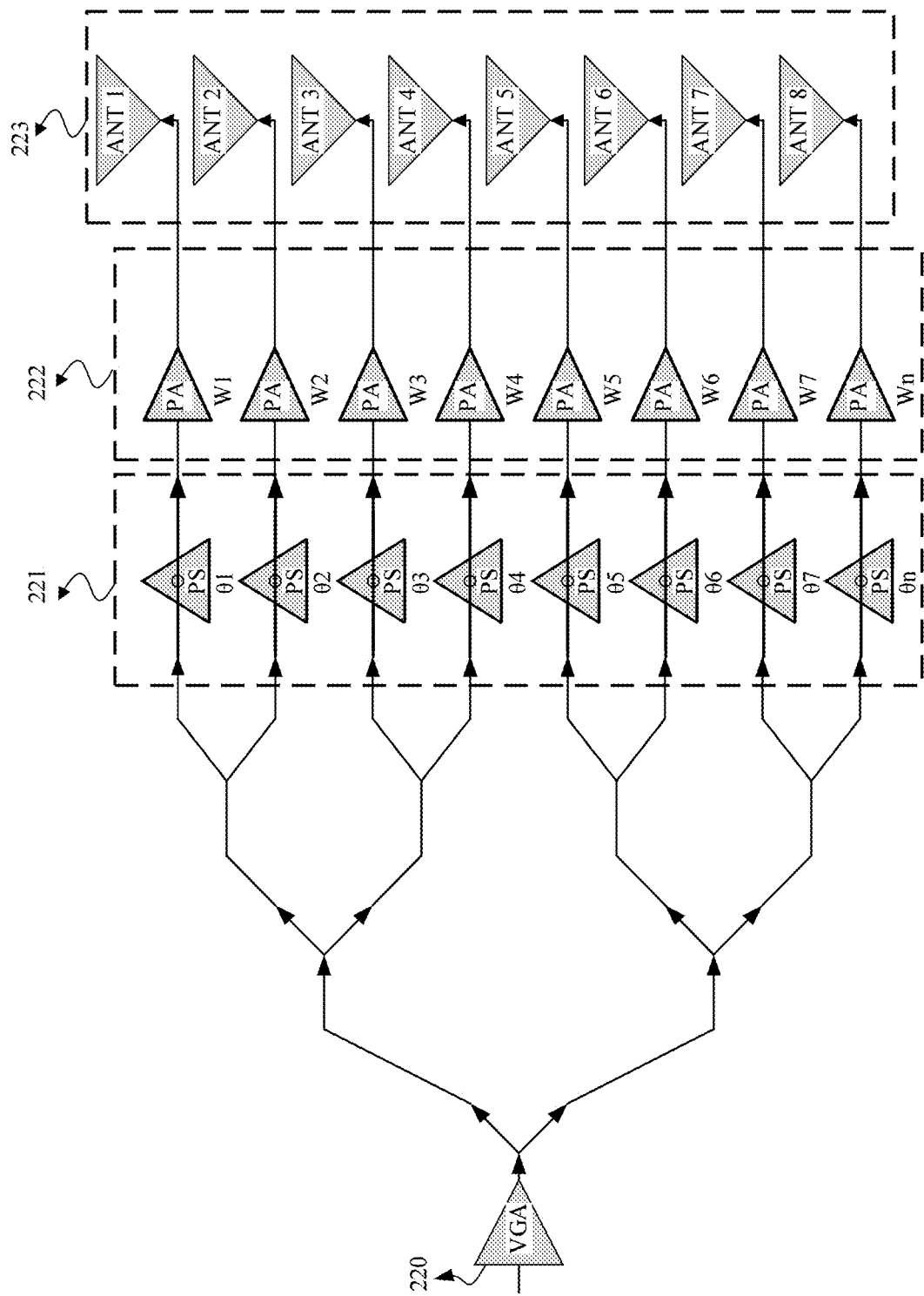
FIG. 12 is a schematic structural diagram of a front-end circuit of a control unit according to an embodiment of the present application.

FIG. 12 is a schematic structural diagram of a front-end circuit of a control unit according to an embodiment of the present application. In a possible implementation, the front-end circuit of the control unit 2002 may include a variable-gain amplifier (VGA) 220, a phase shifter (PS) 221, a power amplifier (PA) 222, and an antenna hardware interface (ANT) 223. It may be understood that each radiating element corresponds to one PS, one PA, and one ANT.

The VGA 220 is an electronic amplifier that controls a gain by adjusting a voltage, and is used in a plurality of remote detection and communications devices. A variable gain is used to enhance dynamic performance in applications such as ultrasonic waves, radar, laser radar, wireless communication, and speech analysis.

The PS 221 may control a signal phase of each radiating element, to change a direction in which signals of an entire antenna array are superposed and strengthened in space, thereby implementing electronic sweeping of a beam in this application.

The PA 222 is used in a power amplifier. The PA 222 is an amplifier that can generate, at a given distortion rate, a maximum power output to drive a load.

The ANT 223 is configured to connect to the antenna array in the embodiments of the present application.

First, front-end circuits of the radiating elements 601, 602, 603 to 613, 701, 702, and 703 to 713 included in the first antenna subarray in the vertical direction are turned on, PAs 222 and PSs 221 in front-end circuits in columns in which radiating elements 101, 201, 301, 401, 501, 801, 901, 1001, and 1101 are located are in an off state, PAs 222 do not feed, and the PSs 221 set a codeword of 00. In FIG. 11, dark gray represents turned-on radiating elements (such as 601 and 701), and white represents turned-off radiating elements (such as 201 and 301).

2. Weighting of the element in the array: As shown in FIG. 11, input powers of the PAs 222 in the front-end circuits of the turned-on radiating elements (601, 602, 603 to 613, 701, 702, and 703 to 713) in the vertical direction are $HW_n = [W_1, W_2, W_3 \ldots W_N]$, phases of the PSs 221 are $HW_{\theta n} = [\theta_1, \theta_2, \theta_3 \ldots \theta_N]$, and an input power $HW_n$ of the antenna array is configured according to a Hanning window function in the following formula (1):

$$W_1 = W_N = K_1, \quad (1)$$
$$W_2 = W_{N-1} = K_2$$
$$W_3 = W_{N-2} = K_3,$$
$$\vdots \qquad \vdots$$
$$W_{N/2} = W_{N/2-1} = K_n, \text{ and}$$
$$K_1 < K_2 < K_3 < K_n.$$

In the formula (1), $W_1, W_2, W_3 \ldots W_N$ represent input powers of the PAs 222, and $K_1, K_2, K_3 \ldots K_n$ represent weighting coefficients of a Hanning window function. A main purpose of weighting is to increase a beam width, to reduce a quantity of to-be-swept beams during beam sweeping. A specific weighting amplitude is not limited in this embodiment of the present application. Based on the phase $HW_\theta$ of the antenna array, all the PSs 221 are set to have 0-degree phase configurations. Input powers of PAs 222 in front-end circuits of turned-on elements in a horizontal direction (radiating elements 601 and 701, 602 and 702, 603 and 703, 604 and 704, 605 and 705, 606 and 706, 607 and 707, 608 and 708, 609 and 709, 610 and 710, 611 and 711) are $HW_m = [W_6, W_7]$, phases of the PSs 221 are $HW_{\theta m} = [\theta_6, \theta_7]$, where $W_6 = W_7$, and $\theta_6 = \theta_7$. That is, radiating elements in the horizontal direction have a same input power amplitude and an equal phase.

In this case, a beam width, in the vertical direction, of each first beam formed in the antenna array due to Hanning window weighting is $$\theta_{BW} = \frac{180}{N},$$

and may be increased by approximately 1.8 times compared with a beam width of a common rectangular window function (which is unweighted).

(2) Beam sweeping in the vertical direction: A transmit antenna side sets, through the PS 221, different delays between radiating elements corresponding to the vertical direction, to change a direction of a generated beam. Then, beam sweeping in the vertical direction starts:

$$\theta_d = \frac{2\pi \times d \times \sin(\theta_S)}{\lambda_0}. \quad (2)$$

In the formula (2), $\theta_d$ represents a progressive phase difference of a digital phase shifter, d represents an antenna spacing, $\theta_s$ represents a direction angle of an antenna beam, and $\lambda_0$ represents an antenna wavelength. When a spacing between the radiating elements is given, for example, $$d = \frac{\lambda_0}{2},$$

a direction angle $\theta_s$ of antenna beam sweeping is in direct proportion to a phase difference $\theta_d$ of the digital phase shifter. A phase configuration on the PS 221 is as the following formula (3):

$$HW_{\theta n} = [\theta_1, \theta_2, \theta_3 \ldots \theta_N], \quad (3)$$

$$\theta_N = \theta_{N-1} + \theta_d.$$

In the formula (3), $\theta_1, \theta_2, \theta_3 \ldots \theta_N$ represent input phases of digital phase shifters, that is, radiating elements. $\theta_N$ represents an input phase of an $N^{th}$ radiating element in the vertical direction, $\theta_{N-1}$ represents an input phase of an $(N-1)^{th}$ radiating element in the vertical direction, and $\theta_d$ represents a phase difference between the $N^{th}$ radiating element and the $(N-1)^{th}$ radiating element.

Beam direction angles of the antenna array are different in different application scenarios. Usually, a radio base station needs to meet a requirement of sector coverage of a beam sweeping range $\Phi = [-60, 60]$ of a transceiver antenna, and a beam sweeping step $\theta_s$ of the antenna is related to a beam width. Usually, when $$\theta_S = \frac{\theta_{BW}}{2},$$

the beam sweeping step of the antenna meets a precision requirement. A beam width of a wide beam formed through Hanning window weighting is $$\theta_{BW} = \frac{180}{N},$$

and a quantity of to-be-swept beams in the entire vertical direction is $N_s$:

$$N_S = \frac{\Phi}{\theta_S} = \frac{\Phi}{\theta_{BW}/2} = \frac{120}{90/N} = 1.33 \times N. \quad (4)$$

In the formula (4), $N_s$ represents the quantity of to-be-swept beams, $\Phi$ represents the beam sweeping range, $\theta_{BW}$ represents the beam width in the vertical direction, and N represents the quantity of radiating elements in the vertical direction. Therefore, it can be learned from the formula (6) that the quantity $N_s$ of to-be-swept beams is 1.33×N, and the quantity is 1.8 times less than a quantity of to-be-swept beams in a conventional manner. A sector ID corresponding to each generated beam is stored in a register, and a beam direction is logically controlled using an FPGA and the like.

Step 3: Perform initial beam configuration in the horizontal direction, including (1) initial beam setting in the horizontal direction and (2) beam sweeping in the horizontal direction.

Figure 14:
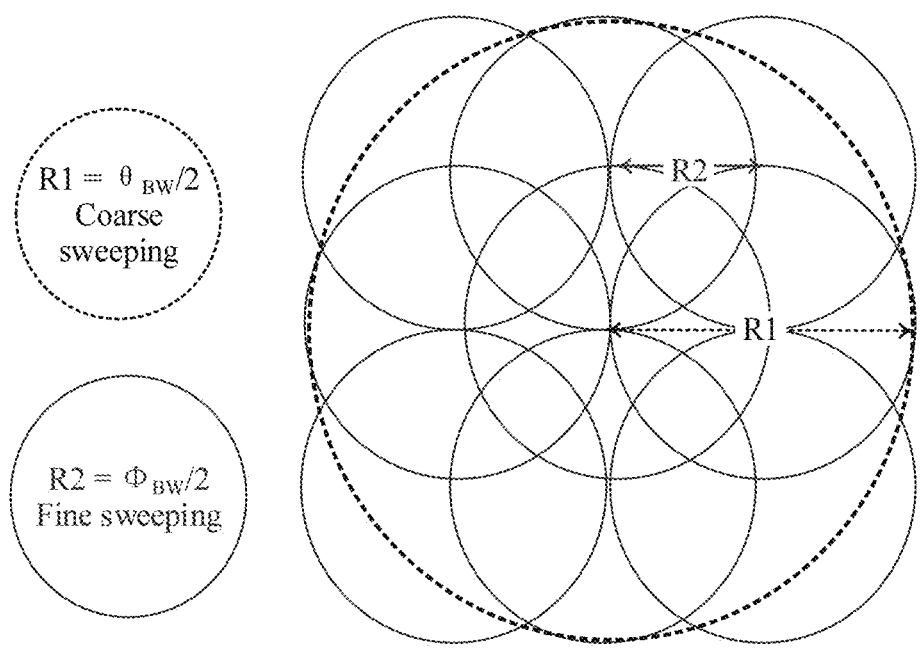
FIG. 14 is a schematic diagram of fine sweeping in a nine-grid form according to an embodiment of the present application.

(1) A manner of initial configuration in the horizontal direction is similar to that in the vertical direction. A main difference lies in that different radiating elements are turned on. As shown in FIG. 14, initial beam setting in the horizontal direction includes two parts turning on and turning off of an element in the array and weighting of the element in the array. The two parts are both related to configuration of a front-end circuit of the radiating element.

Figure 13:
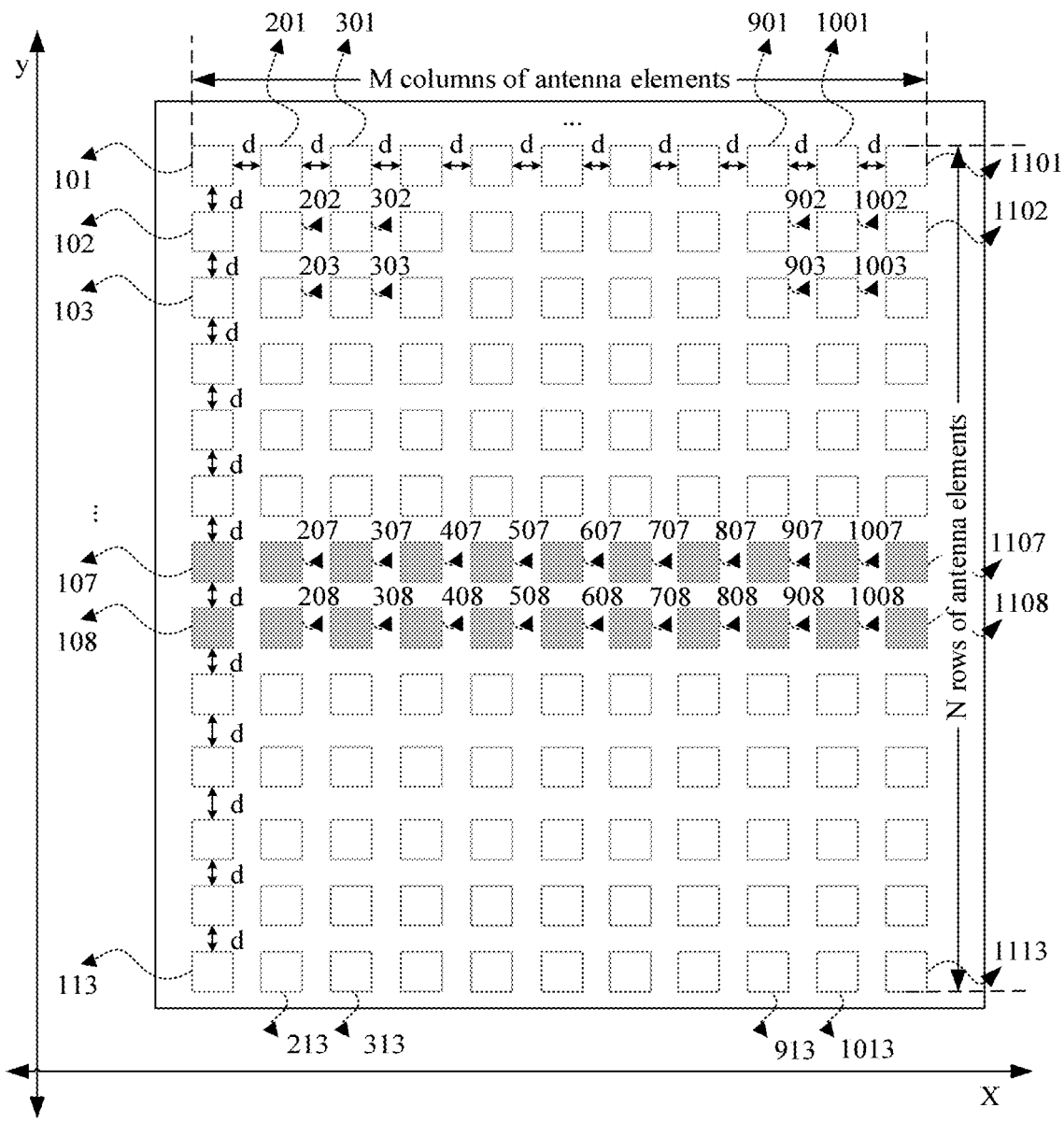
FIG. 13 is a schematic diagram of an antenna array in which a second antenna subarray is turned on according to an embodiment of the present application.

(1) Turning on and turning off of an element in the array
A rectangular antenna array includes a total of M elements in a horizontal direction and a total of N elements in a vertical direction. FIG. 13 is a schematic diagram of an antenna array in which a second antenna subarray is turned on according to an embodiment of the present application. The second antenna array includes radiating elements 101, 201, 301 to 901, 1001, and 1101. Similarly, in the second antenna subarray, a spacing in an x direction (that is, a second direction) is d, and a spacing in a y direction (that is, a first direction) is also d. In FIG. 13, X2=2, and Y2=11.

First, front-end circuits of radiating elements 107, 207, 307, 407 to 1107, and 108, 208, 308, and 408 to 1108 in the horizontal direction are turned on, power amplifiers 222 and phase shifters 221 in front-end circuits of radiating elements corresponding to rows in which horizontal radiating elements 101, 102, 103, 104, 105, 106, 109, 1010, and 1011 are located are in an off state, power amplifiers 221 do not feed, and the phase shifters 221 set a codeword of 00. In FIG. 13, dark gray represents turned-on radiating elements (such as 107 and 108), and white represents turned-off radiating elements (such as 101 and 102).

(2) Weighting of the element in the array: As shown in FIG. 13, input powers of the power amplifiers 221 in the front-end circuits of the turned-on radiating elements (107, 207, 307, 407 to 1107, 108, 208, 308, and 408 to 1108) in the horizontal direction are $HW_m=[W_1, W_2, W_3 \ldots W_M]$, phases of the phase shifters 222 are $HW_{\theta m}=[\theta_1, \theta_2, \theta_3 \ldots \theta_M]$, and an input power $HW_m$ of the antenna array is configured according to a Hanning window function in the formula (1) (a specific weighting amplitude is not limited), to increase a beam width. Based on a phase $HW_0$ of an antenna, all the phase shifters 221 are set to have 0-degree phase configurations. Input powers of power amplifiers 221 in front-end circuits of turned-on elements in the vertical direction (radiating elements 107 and 108, 207 and 208, 307 and 308, 407 and 408, 507 and 508, 607 and 608, 707 and 708, 807 and 808, 907 and 908, 1007 and 1008, 1107 and 1108) are $HW_n=[W_7,W_8]$, phases of the phase shifters 222 are $HW_{\theta n}=[\theta_7,\theta_8]$, where $W_7=W_8$, and $\theta_7=\theta_8$. That is, radiating elements in the vertical direction have a same input power amplitude and an equal phase.

In this case, a beam width, in the horizontal direction, of each second beam formed in the antenna array due to Hanning window weighting is $$\theta_{BW} = \frac{180}{M},$$

and is increased by 1.8 times compared with a beam width of a common rectangular window function (which is unweighted).

(2) Beam sweeping in the horizontal direction:

A manner of beam sweeping in the horizontal direction is similar to that in the vertical direction. A transmit antenna side sets, through the phase shifter 221, different delays between radiating elements corresponding to the horizontal direction, to change a direction of a generated beam. Then, beam sweeping in the horizontal direction starts. A phase configuration in the phase shifter 221 is as the following formula (5):

$$HW_{\theta m}=[\theta_1,\theta_2,\theta_3 \ldots \theta_M]. \quad (5)$$

In the formula (5), $\theta_1, \theta_2, \theta_3 \ldots \theta_M$ represent input phases of digital phase shifters, that is, radiating elements:

$$\theta_M=\theta_{M-1}+\theta_d. \quad (6)$$

In the formula (6), $\theta_M$ represents an input phase of an $M^{th}$ radiating element in the horizontal direction, $\theta_{M-1}$ represents an input phase of an $(M-1)^{th}$ radiating element in the horizontal direction, and $\theta_d$ represents a phase difference between the $M^{th}$ radiating element and the $(M-1)^{th}$ radiating element.

Beam direction angles of the antenna array are different in different application scenarios. Usually, a radio base station needs to meet a requirement of sector coverage of a beam sweeping range $\Phi=[-60,60]$ of a transceiver antenna, and a beam sweeping step $\theta_s$ of the antenna is related to a beam width. Usually, when $$\theta_S = \frac{\theta_{BW}}{2},$$

the beam sweeping step meets a precision requirement. A beam width of a wide beam formed through Hanning window weighting is $$\theta_{BW} = \frac{180}{M},$$

and a quantity of to-be-swept beams in the entire horizontal direction is $N_s$:

$$N_S = \frac{\Phi}{\theta_S} = \frac{\Phi}{\theta_{BW}/2} = \frac{120}{90/M} = 1.33 \times M \quad (7)$$

In the formula (7), N represents the quantity of to-be-swept beams, $\Phi$ represents the beam sweeping range, $\theta_{BW}$ represents the beam width in the horizontal direction, and M represents the quantity of radiating elements in the horizontal direction. Therefore, it can be learned from the formula (7) that the quantity N of to-be-swept beams is 1.33×M, and the quantity is 1.8 times less than a quantity of to-be-swept beams in a conventional manner. A sector ID corresponding to each generated beam is stored in a register, and a beam direction is logically controlled using an FPGA and the like.

Step 4: Perform narrow beam fine sweeping process.

Figure 15:
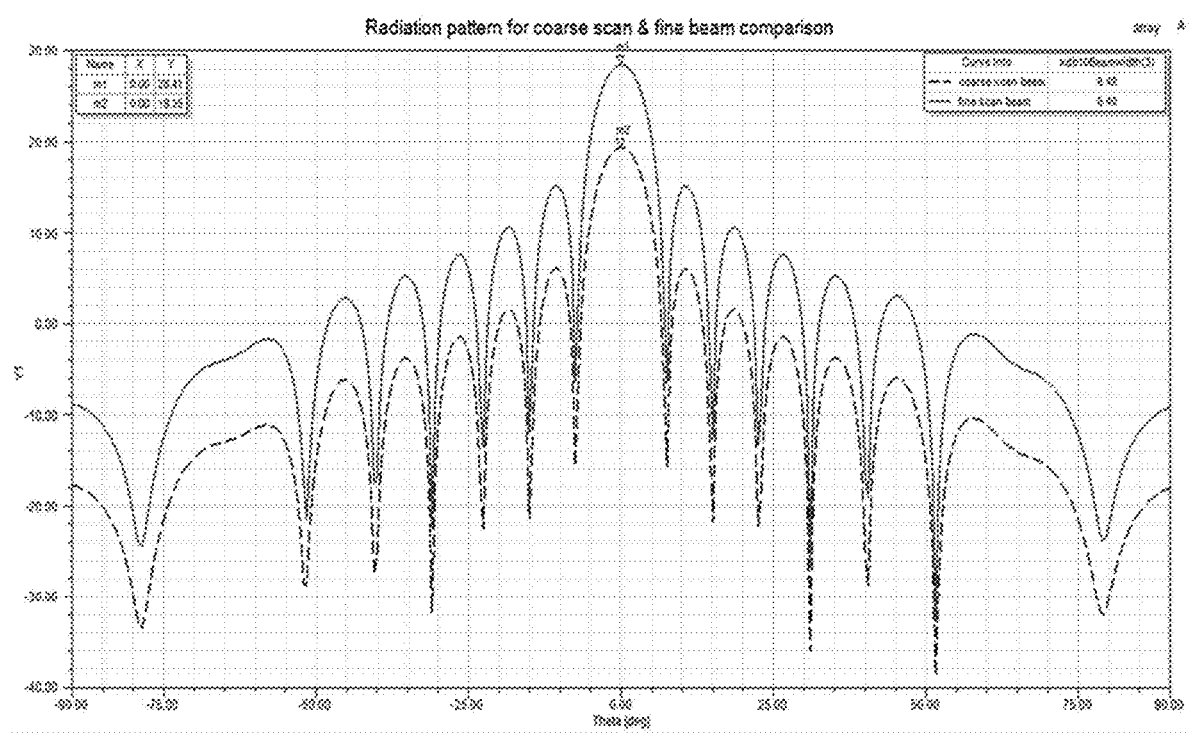
FIG. 15 is a schematic diagram of comparison between antenna patterns of a narrow beam and a wide beam according to an embodiment of the present application.

After a previous-level coarse sweeping process, a power detector in a front-end circuit of a receive antenna array detects a maximum power obtained after wide beam sweeping in the vertical or horizontal direction, and notifies the maximum power to a base station at a transmit end. The transmit end performs, in a determined local area corresponding to the maximum power, fine sweeping in a nine-grid form shown in FIG. 14. In FIG. 11, the PSs 221 and the PAs 222 in transceiver components of the front-end circuits of the antenna array are all turned on, and all units in the antenna array 2002 are active units. Phases of the phase shifters 221 in the front-end circuits are $\Phi_n=[\Phi_1, \Phi_2 \ldots \Phi_{N-1},\Phi_N]$, and input powers of the PAs 222 are $PD_n=[P_1, P_2 \ldots P_{N-1}, P_N]$. The PSs 221 are configured to $\Phi_1=\Phi_{N-1}=\Phi_N$, and the power amplifiers are configured to $P_1=P_2=P_{N-1}=P_N$. That is, the antenna array 2002 is fed in an equi-amplitude in-phase feeding manner. In this case, all radiating elements of the array are turned on, to form a high-gain narrow beam shown in FIG. 15. A beam width $\Phi_{BW}$ of the narrow beam is the same as a width $\theta_{BW}$ of a to-be-vertically-or-horizontally-swept beam, that is, $\Phi_{BW}=\theta_{BW}$. A peak gain of the narrow beam is approximately $\delta$ decibels (dB) higher than a gain of the to-be-vertically-or-horizontally-swept beam:

$$\delta = 10 \times \log_{10} \frac{M \times N}{4 \times M(\text{or } N)} + K. \quad (8)$$

In the formula (8), M represents a quantity of units in the horizontal direction, N represents a quantity of units in the vertical direction, and K represents a constant. When Hanning window weighting is performed, K=1.8. Therefore, a larger antenna array scale indicates a higher peak gain of a formed narrow beam. When nine-grid sweeping is performed on the narrow beam, an EIRP can be improved, and beam alignment can be more accurately implemented. The fine sweeping process is essentially the same as the wide beam sweeping manner, but narrow beam sweeping can be completed by performing only $S^2$ (S=3) times of beam sweeping. In this case, overall beam sweeping and alignment are completed. A total quantity of to-be-swept beams is reduced from original $N_{sector} \propto F$ (M×N) to $N_{sector} \propto F$ (M+N), thereby greatly reducing a beam alignment time in a large array.

Figure 16:
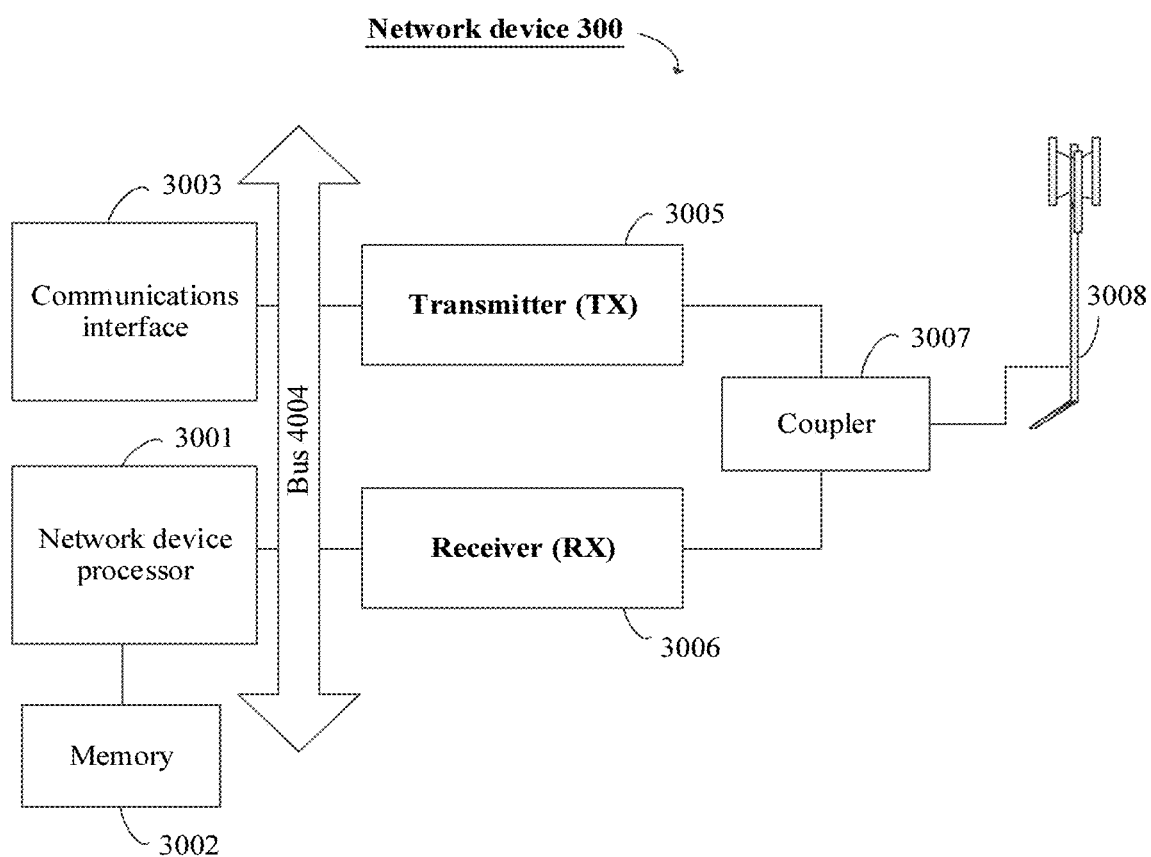
FIG. 16 is a schematic structural diagram of a network device according to an embodiment of the present application.

FIG. 16 shows a network device 300 provided in some embodiments of this application. As shown in FIG. 16, the network device 300 may include one or more network device processors 3001, a memory 3002, a communications interface 3003, a transmitter 3005, a receiver 3006, a coupler 3007, and an antenna 3008. These components may be connected through a bus 3004 or in another manner. In FIG. 16, an example in which the components are connected through the bus is used.

The communications interface 3003 may be used for communication between the network device 300 and another communications device, for example, a terminal device or another network device. Further, the terminal device may be a terminal 400 shown in FIG. 18. Further, the communications interface 3003 may be an LTE $4^{th}$ generation (4G) communications interface, or a communications interface in 5G or future new radio. A wireless communications interface is not limited thereto, and the network device 300 may be further configured with a wired communications interface 3003 to support wired communication. For example, a backhaul connection between the network device 300 and another network device 300 may be a wired communication connection.

The transmitter 3005 may be configured to transmit a signal output by the network device processor 3001, for example, implement directional sending through beamforming. The receiver 3006 may be configured to receive a mobile communication signal received by the antenna 3008 (which may be an antenna array), for example, implement directional receiving through beamforming. In some embodiments of this application, the transmitter 3005/receiver 3006 may include a beamforming controller configured to multiply a transmitted signal/a received signal by a weight vector, to control directional sending/receiving of the signal.

In some embodiments of this application, the transmitter 3005 and the receiver 3006 may be considered as a wireless modem. The network device 300 may include one or more transmitters 3005 and one or more receivers 3006. The antenna 3008 may be configured to convert electromagnetic energy in a transmission line into an electromagnetic wave in free space, or convert an electromagnetic wave in free space into electromagnetic energy in a transmission line. The coupler 3007 may be configured to divide the mobile communication signal into a plurality of signals, and distribute the plurality of signals to a plurality of receivers 3006.

The memory 3002 is coupled to the network device processor 3001, and is configured to store various software programs and/or a plurality of sets of instructions. Further, the memory 3002 may include a high-speed random-access memory (RAM), or may include a nonvolatile memory, for example, one or more disk storage devices, a flash memory device, or another nonvolatile solid-state storage device. The memory 3002 may store an operating system (referred to as a system below), for example, an embedded operating system such as UCOS, VXWORKS, or RTLINUX. The memory 3002 may further store a network communications program. The network communications program may be used to communicate with one or more additional devices, one or more terminal devices, and one or more network devices.

The network device processor 3001 may be configured to manage a radio channel, establish and disconnect a call and communications link, provide cell handover control for a terminal in a local control area, and the like. Further, the network device processor 3001 may include an administration module/communication module (AM/CM) (a center for speech channel switching and information exchange), a basic module (BM) (configured to implement call processing, signaling processing, radio resource management, radio link management, and circuit maintenance functions), a transcoder and sub-multiplexer (TCSM) (configured to implement multiplexing/demultiplexing and transcoding functions), and the like.

In this embodiment of this application, network device processor 3001 may be configured to read and execute a computer-readable instruction. Further, the network device processor 3001 may be configured to invoke a program stored in the memory 3002, for example, a program for implementing, on the side of the network device 300, the signal transmission method provided in one or more embodiments of this application, and execute an instruction included in the program.

It may be understood that the network device 300 may be the network device 001 in the wireless communications system 00 shown in FIG. 3, and may be implemented as a BTS, a wireless transceiver, a basic service set (BSS), an extended service set (ESS), a NodeB, an eNodeB, an AP, a TRP, or the like.

It should be noted that the network device 300 shown in FIG. 16 is only an implementation of the embodiments of this application. In actual application, the network device 300 may alternatively include more or fewer components, and this is not limited herein.

Figure 17:
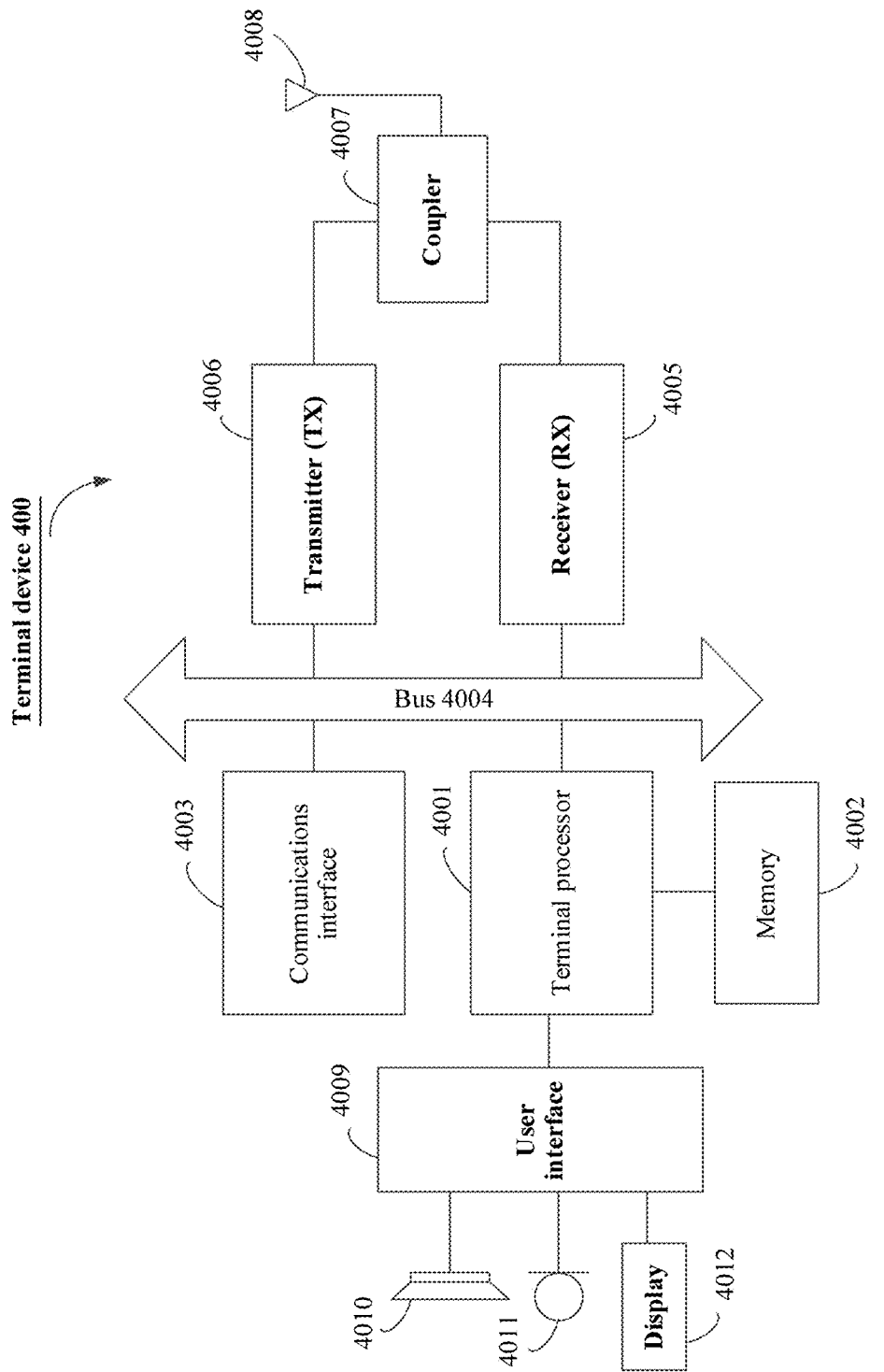
FIG. 17 is a schematic structural diagram of a terminal device according to an embodiment of the present application.

FIG. 17 shows a terminal 400 provided in some embodiments of this application. As shown in FIG. 17, the terminal 400 may include one or more terminal processors 4001, a memory 4002, a communications interface 4003, a receiver 4005, a transmitter 4006, a coupler 4007, an antenna 4008, and a terminal interface 4002, and an input/output module (including an audio input/output module 4010, a key input module 4011, a display 4012, and the like). These components may be connected through a bus 4004 or in another manner. In FIG. 17, an example in which the components are connected through the bus is used.

The communications interface 4003 may be used for communication between the terminal 400 and another communications device, for example, a network device. Further, the network device may be a network device 300 shown in FIG. 17. Further, the communications interface 4003 may be an LTE 4G communications interface, or a communications interface in 5G or future new radio. A wireless communications interface is not limited thereto, and the terminal 400 may be further configured with a wired communications interface 4003, for example, a local area network (LAN) interface.

The transmitter 4006 may be configured to transmit a signal output by the terminal processor 4001, for example, implement directional sending through beamforming. The receiver 4005 may be configured to receive a mobile communication signal received by the antenna 4008 (which may be an antenna array), for example, implement directional receiving through beamforming. In some embodiments of this application, the transmitter 3005/receiver 3006 may include a beamforming controller configured to multiply a transmitted signal/a received signal by a weight vector, to control directional sending/receiving of the signal.

In some embodiments of this application, the transmitter 4006 and the receiver 4005 may be considered as a wireless modem. The terminal device 400 may include one or more transmitters 4006 and one or more receivers 4005. The antenna 4008 may be configured to convert electromagnetic energy in a transmission line into an electromagnetic wave in free space, or convert an electromagnetic wave in free space into electromagnetic energy in a transmission line. The coupler 4007 is configured to divide the mobile communication signal received by the antenna 4008 into a plurality of signals, and distribute the plurality of signals to a plurality of receivers 4005.

In addition to the transmitter 4006 and the receiver 4005 shown in FIG. 17, the terminal device 400 may further include other communications components such as a Global Positioning System (GPS) module, a BLUETOOTH module, and a WI-FI module. The foregoing described wireless communication signal is not limited thereto, and the terminal 400 may further support other wireless communication signals, for example, a satellite signal and a short-wave signal. Wireless communication is not limited thereto, and the terminal 400 may be further configured with a wired network interface (for example, a LAN interface) to support wired communication.

The input/output module may be configured to implement interaction between the terminal 400 and a terminal/an external environment, and may mainly include the audio input/output module 4010, the key input module 4011, the display 4012, and the like. Further, the input/output module may further include a camera, a touchscreen, a sensor, and the like. The input/output module communicates with the terminal processor 4001 through the terminal interface 4009.

The memory 4002 is coupled to the terminal processor 4001, and is configured to store various software programs and/or a plurality of sets of instructions. Further, the memory 4002 may include a high-speed RAM, or may include a nonvolatile memory, for example, one or more disk storage devices, a flash memory device, or another nonvolatile solid-state storage device. The memory 4002 may store an operating system (which is referred to as a system below), for example, an embedded operating system such as ANDROID, IOS, WINDOWS, or LINUX. The memory 4002 may further store a network communications program. The network communications program may be used to communicate with one or more additional devices, one or more terminal devices, and one or more network devices. The memory 4002 may further store a terminal interface program. The terminal interface program may be used to vividly display content of an application program in a graphical operation interface, and receive, using an input control such as a menu, a dialog box, or a key, a control operation performed by a terminal on the application program.

In some embodiments of this application, the memory 4002 may be configured to store a program for implementing, on the side of the terminal 400, the signal transmission method provided in one or more embodiments of this application. For an implementation of the signal transmission method provided in one or more embodiments of this application, refer to the following embodiments.

The terminal processor 4001 may be configured to read and execute a computer-readable instruction. Further, the terminal processor 4001 may be configured to invoke a program stored in the memory 4002, for example, a program for implementing, on the side of the terminal device 400, the signal transmission method provided in one or more embodiments of this application, and execute an instruction included in the program.

It may be understood that the terminal 400 may be the terminal 002 in the wireless communications system 00 shown in FIG. 3, and may be implemented as a mobile device, a mobile station, a mobile unit, a radio unit, a remote unit, a terminal agent, a mobile client, or the like.

It should be noted that the terminal device 400 shown in FIG. 17 is only an implementation of the embodiments of this application. In actual application, the terminal device 400 may further include more or fewer components, and this is not limited herein.

Figure 18:
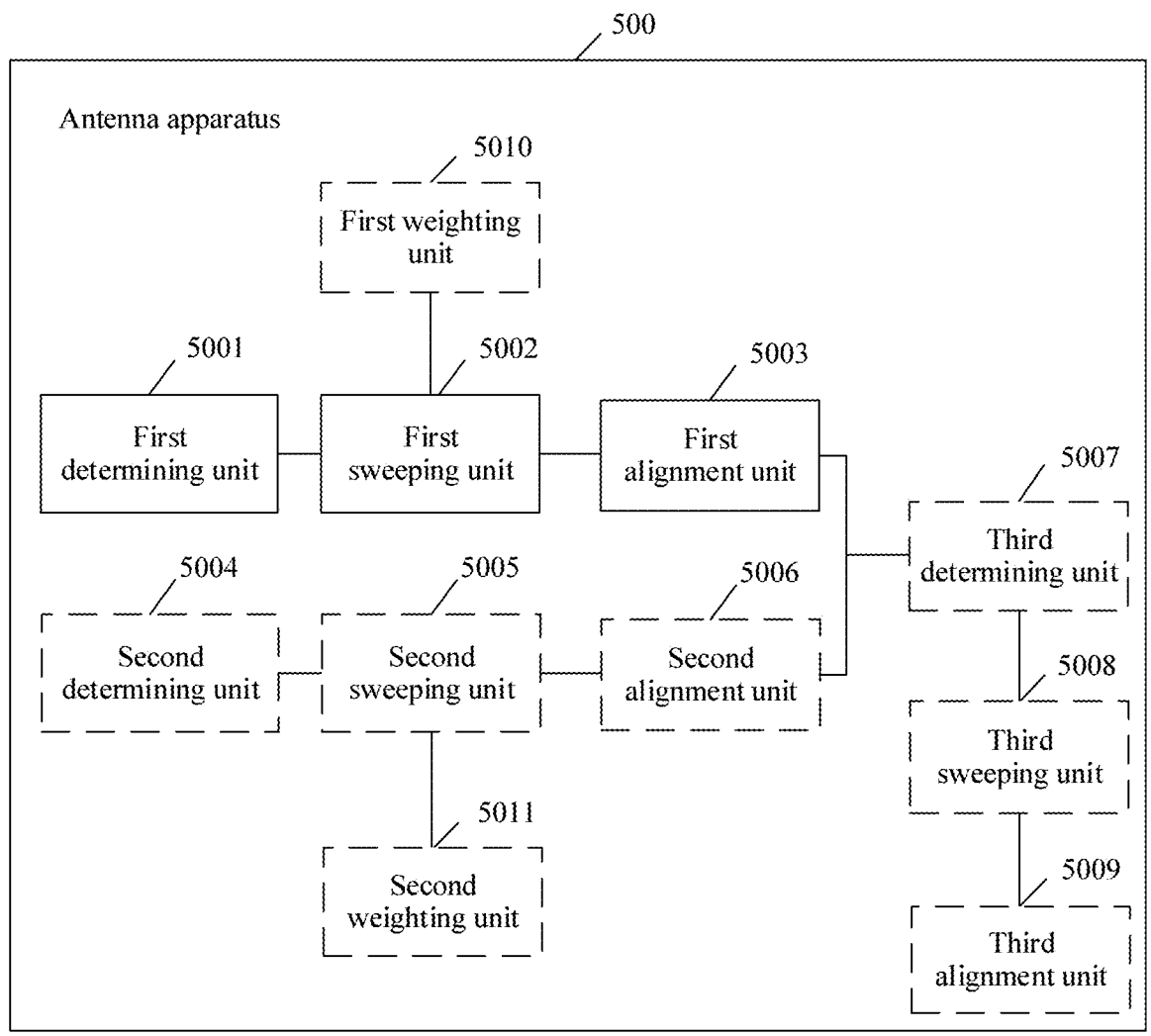
FIG. 18 is a schematic structural diagram of an antenna apparatus according to an embodiment of the present application.

FIG. 18 is a schematic structural diagram of an antenna apparatus according to an embodiment of the present application. The antenna apparatus 500 may include a first determining unit 5001, a first sweeping unit 5002, and a first alignment unit 5003. Optionally, the antenna apparatus may further include a second determining unit 5004, a second sweeping unit 5005, a second alignment unit 5006, a third determining unit 5007, a third sweeping unit 5008, a third alignment unit 5009, a first weighting unit 5010, and a second weighting unit 5011. Details of the units are described as follows.

The first determining unit 5001 is configured to determine a first antenna subarray from the N rows and M columns of radiating elements, where the first antenna subarray includes X1 rows and Y1 columns of radiating elements, $1 \leq X1 \leq N$, $1 \leq Y1 \leq M$, and $X1 > Y1$.

The first sweeping unit 5002 is configured to control a phase shift increment change of the first antenna subarray to generate a plurality of first beams, where different phase shift increments correspond to different first beams.

The first alignment unit 5003 is configured to determine a first aligned beam from the plurality of first beams based on a feedback from a receive end.

In a possible implementation, the antenna apparatus further includes the second determining unit 5004 configured to determine a second antenna subarray from the N rows and M columns of radiating elements, where the second antenna subarray includes X2 rows and Y2 columns of radiating elements, $1 \leq X2 \leq N$, $1 \leq Y2 \leq M$, and $Y2 > X2$, the second sweeping unit 5005 configured to control a phase shift increment change of the second antenna subarray to generate a plurality of second beams, where different phase shift increments correspond to different second beams, and the second alignment unit 5006 configured to determine a second aligned beam from the plurality of second beams based on a feedback from the receive end.

In a possible implementation, the antenna apparatus further includes the third determining unit 5007 configured to determine a third antenna subarray from the N rows and M columns of radiating elements, where the third antenna subarray includes X3 rows and Y3 columns of radiating elements, $X1 \leq X3 \leq N$, and $Y2 \leq Y3 \leq M$, the third sweeping unit 5008 configured to control the third antenna subarray to generate, based on different phase shift increments, a plurality of third beams with different directions, where centers of circles of projections of the plurality of third beams on the first plane are within an alignment area, and the alignment area is an area in which a projection of the first aligned beam on the first plane intersects a projection of the second aligned beam on the first plane, and the third alignment unit 5009 configured to determine a third aligned beam from the plurality of third beams based on a feedback from the receive end.

In a possible implementation, the antenna apparatus further includes the first weighting unit 5010 configured to perform Hanning window weighting processing on amplitudes controlled by power amplifiers in each column of radiating elements in the first antenna subarray.

In a possible implementation, the antenna apparatus further includes the second weighting unit 5011 configured to perform Hanning window weighting processing on amplitudes controlled by power amplifiers in each row of radiating elements in the second antenna subarray.

In a possible implementation, when Y1 is greater than or equal to 2, a column spacing between any two adjacent columns of radiating elements in Y1 columns of radiating elements is d1, and $\lambda/4 \leq d1 \leq k$.

In a possible implementation, each of the Y1 columns of radiating elements includes at least two first radiating elements, a row spacing between any two adjacent rows of first radiating elements in the at least two first radiating elements is d2, and $\lambda/4 \leq d2 \leq \lambda$.

In a possible implementation, a line formed by connecting center points of projections of the plurality of first beams on the first plane is in a first direction, and the first direction is parallel to a column direction of the X1 rows and Y1 columns of radiating elements.

In a possible implementation, a line formed by connecting center points of projections of the plurality of second beams on the first plane is in a second direction, and the second direction is parallel to a row direction of the X2 rows and Y2 columns of radiating elements.

In a possible implementation, the third antenna subarray includes N rows and M columns of radiating elements.

In a possible implementation, a beam width of the first beam in the first direction is K, sweeping steps of the plurality of first beams are K/2, and the first direction is parallel to the column direction of the X1 rows and Y1 columns of radiating elements.

In a possible implementation, a beam width of the second beam in the second direction is K, sweeping steps of the plurality of second beams are K/2, and the second direction is parallel to the row direction of the X2 rows and Y2 columns of radiating elements.

In a possible implementation, the beam width of the first beam in the first direction is K, and/or the beam width of the second beam in the second direction is K, and a beam width of the third beam in the first direction or the second direction is L, the sweeping steps of the plurality of first beams are L/2, and L<K.

In a possible implementation, when X2 is greater than or equal to 2, a row spacing between any two adjacent rows of radiating elements in X2 rows of radiating elements is d3, and $\lambda/4 \leq d3 \leq \lambda$.

In a possible implementation, each of the Y2 rows of radiating elements includes at least two second radiating elements, a column spacing between any two adjacent columns of second radiating elements in the at least two second radiating elements is d4, and $\lambda/4 \leq d4 \leq \lambda$.

In a possible implementation, any two radiating elements in a same row in the first antenna subarray have an equal phase, and any two rows of adjacent radiating elements in the first antenna subarray have an equal phase difference at a same moment.

In a possible implementation, any two radiating elements in a same column in the second antenna subarray have an equal phase, and any two columns of adjacent radiating elements in the second antenna subarray have an equal phase difference at a same moment.

It should be noted that, for functions of the functional units in the antenna apparatus 500 described in this embodiment of the present application, refer to related descriptions of the control unit in the antenna apparatus in FIG. 3 to FIG. 15. Details are not described herein again.

In the foregoing embodiments, the descriptions of each embodiment have respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required for this application.

In the several embodiments provided in this application, it should be understood that the disclosed apparatuses may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electric or another form.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The computer software product is stored in a storage medium and includes several instructions for instructing a computer device (which may be a personal computer, a server, a network device, or the like, and which may be a processor in a computer device) to perform all or some of the steps of the methods described in the embodiments of this application. The foregoing storage medium includes any medium that can store program code, such as a Universal Serial Bus (USB) flash drive, a removable hard disk, a magnetic disk, an optical disc, a read-only memory (ROM), or a RAM.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An antenna apparatus comprising:
an antenna array comprising N rows and M columns of radiating elements;
a processor coupled to the antenna array and configured to:
determine a first antenna subarray from the N rows and M columns of radiating elements, wherein the first antenna subarray comprises X1 rows and Y1 columns of the radiating elements, wherein $1 \leq X1 \leq N$, wherein $1 \leq Y1 \leq M$, and wherein $X1 > Y1$;
control a first phase shift increment change of the first antenna subarray to generate a plurality of first beams, wherein different first phase shift increments correspond to different first beams;
determine a first aligned beam from the first beams based on a first feedback from a receive end;
determine a second antenna subarray from the N rows and M columns of the radiating elements, wherein the second antenna subarray comprises X2 rows and Y2 columns of the radiating elements, wherein $1 \leq X2 \leq N$, wherein $1 \leq Y2 \leq M$, and wherein $Y2 > X2$;
control a second phase shift increment change of the second antenna subarray to generate a plurality of second beams, wherein different second phase shift increments correspond to different second beams; and
determine a second aligned beam from the second beams based on a second feedback from the receive end.

2. The antenna apparatus of claim 1, wherein Y1 is greater than or equal to 2, wherein a column spacing between any two adjacent columns of the radiating elements in the Y1 columns of the radiating elements is d1, wherein $\lambda/4 \leq d1 \leq \lambda$, and wherein $\lambda$ represents a wavelength of the antenna array.

3. The antenna apparatus of claim 1, wherein the antenna array is located on a first plane, wherein a first line that connects first center points of projections of the first beams on the first plane is in a first direction, and wherein the first direction is parallel to a column direction of the X1 rows and Y1 columns of the radiating elements.

4. The antenna apparatus of claim 3, wherein a beam width of the first beams in the first direction is K, and wherein a quantity of sweeping steps of the first beams is K/2.

5. The antenna apparatus of claim 3, wherein a second line that connects second center points of projections of the second beams on the first plane is in a second direction, and wherein the second direction is parallel to a row direction of the X2 rows and Y2 columns of the radiating elements.

6. The antenna apparatus of claim 5, wherein a beam width of the second beams in the second direction is K, and wherein a quantity of sweeping steps of the second beams is K/2.

7. The antenna apparatus of claim 1, wherein each of the Y1 columns of the radiating elements comprises at least two first radiating elements, wherein a row spacing between any two adjacent rows of the first radiating elements in the at least two first radiating elements is d2, wherein $\lambda/4 \leq d2 \leq \lambda$, and wherein $\lambda$ represents a wavelength of the antenna array.

8. The antenna apparatus of claim 1, wherein X2 is greater than or equal to 2, wherein a row spacing between any two adjacent rows of the radiating elements in the X2 rows of the radiating elements is d3, wherein $\lambda/4 \leq d3 \leq \lambda$, and wherein $\lambda$ represents a wavelength of the antenna array.

9. The antenna apparatus of claim 1, wherein each of the X2 rows of the radiating elements comprises at least two second radiating elements, wherein a column spacing between any two adjacent columns of the second radiating elements in the at least two second radiating elements is d4, wherein $\lambda/4 \leq d4 \leq \lambda$, and wherein $\lambda$ represents a wavelength of the antenna array.

10. The antenna apparatus of claim 1, wherein the processor is further configured to:
determine a third antenna subarray from the N rows and M columns of the radiating elements, wherein the third antenna subarray comprises X3 rows and Y3 columns of the radiating elements, wherein $X1 \leq X3 \leq N$, and wherein $Y2 \leq Y3 \leq M$;
control the third antenna subarray to generate a plurality of third beams with different directions based on different phase shift increments, wherein centers of circles of projections of the third beams on a first plane are within an alignment area, and wherein the alignment area is a projection of the first aligned beam on the first plane that intersects a projection of the second aligned beam on the first plane; and
determine a third aligned beam from the third beams based on a feedback from the receive end.

11. The antenna apparatus of claim 10, wherein a beam width of the first beams in a first direction is K or a beam width of the second beams in a second direction is K, wherein a beam width of the third beams in the first direction or the second direction is L, wherein a quantity of sweeping steps of the first beams is L/2, and wherein $L < K$.

12. An antenna apparatus comprising:
a memory configured to store a program code; and
a processor coupled to the memory, wherein the program code causes the processor to:
determine a first antenna subarray from an antenna array, wherein the antenna array comprises N rows and M columns of radiating elements, wherein the first antenna subarray comprises X1 rows and Y1 columns of the radiating elements, wherein $1 \leq X1 \leq N$, wherein $1 \leq Y1 \leq M$, and wherein $X1 > Y1$;
control a first phase shift increment change of the first antenna subarray to generate a plurality of first beams, wherein different first phase shift increments correspond to different first beams;
determine a first aligned beam from the first beams based on a first feedback from a receive end;
determine a second antenna subarray from the N rows and M columns of the radiating elements, wherein the second antenna subarray comprises X2 rows and Y2 columns of the radiating elements, wherein $1 \leq X2 \leq N$, wherein $1 \leq Y2 \leq M$, and wherein $Y2 > X2$;
control a second phase shift increment change of the second antenna subarray to generate a plurality of second beams, wherein different second phase shift increments correspond to different second beams; and
determine a second aligned beam from the second beams based on a second feedback from the receive end.

13. The antenna apparatus of claim 12, wherein Y1 is greater than or equal to 2, wherein a column spacing between any two adjacent columns of the radiating elements in the Y1 columns of radiating elements is d1, wherein $\lambda/4 \leq d1 \leq \lambda$, and wherein $\lambda$ represents a wavelength of the antenna array.

14. The antenna apparatus of claim 12, wherein the antenna array is located on a first plane, wherein a first line that connects first center points of projections of the first beams on the first plane is in a first direction, and wherein the first direction is parallel to a column direction of the X1 rows and Y1 columns of the radiating elements.

15. The antenna apparatus of claim 14, wherein a beam width of the first beams in the first direction is K, wherein a quantity of sweeping steps of the first beams is K/2, and wherein the first direction is parallel to the column direction of the X1 rows and Y1 columns of the radiating elements.

16. The antenna apparatus of claim 14, wherein a second line that connects second center points of projections of the second beams on the first plane is in a second direction, and wherein the second direction is parallel to a row direction of the X2 rows and Y2 columns of the radiating elements.

17. The antenna apparatus of claim 16, wherein a beam width of the second beams in the second direction is K, wherein a quantity of sweeping steps of the second beams is K/2, and wherein the second direction is parallel to the row direction of the X2 rows and Y2 columns of the radiating elements.

18. The antenna apparatus of claim 12, wherein each of the Y1 columns of the radiating elements comprises at least two first radiating elements, wherein a row spacing between any two adjacent rows of the first radiating elements in the at least two first radiating elements is d2, wherein $\lambda/4 \leq d2 \leq \lambda$, and wherein $\lambda$ represents a wavelength of the antenna array.

19. The antenna apparatus of claim 12, wherein X2 is greater than or equal to 2, wherein a row spacing between any two adjacent rows of the radiating elements in the X2 rows of the radiating elements is d3, wherein $\lambda/4 \leq d3 \leq \lambda$, and wherein $\lambda$ represents a wavelength of the antenna array.

20. The antenna apparatus of claim 12, wherein each of the X2 rows of the radiating elements comprises at least two second radiating elements, wherein a column spacing between any two adjacent columns of the second radiating elements in the at least two second radiating elements is d4, wherein $\lambda/4 \leq d4 \leq \lambda$, and wherein $\lambda$ represents a wavelength of the antenna array.

* * * * *